US009503386B2

(12) United States Patent
Kurihara et al.

(10) Patent No.: US 9,503,386 B2
(45) Date of Patent: Nov. 22, 2016

(54) COMPUTER PRODUCT, TERMINAL, SERVER, DATA SHARING METHOD, AND DATA DISTRIBUTION METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Hiromasa Yamauchi, Kawasaki (JP); Takahisa Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 461 days.

(21) Appl. No.: 13/801,433

(22) Filed: Mar. 13, 2013

(65) Prior Publication Data
US 2013/0198390 A1  Aug. 1, 2013

Related U.S. Application Data

(63) Continuation of application No. PCT/JP2010/066253, filed on Sep. 17, 2010.

(51) Int. Cl.
*H04L 12/911* (2013.01)
*G06F 17/30* (2006.01)

(52) U.S. Cl.
CPC ......... *H04L 47/70* (2013.01); *G06F 17/30283* (2013.01)

(58) Field of Classification Search
CPC .................... H04L 47/70; G06F 17/30283
USPC ..................................................... 709/226
See application file for complete search history.

(56) References Cited

U.S. PATENT DOCUMENTS

| 2005/0187977 | A1  | 8/2005 | Frost |
| 2005/0188089 | A1* | 8/2005 | Lichtenstein et al. ........ 709/226 |
| 2006/0080457 | A1* | 4/2006 | Hiramatsu et al. .......... 709/232 |

(Continued)

FOREIGN PATENT DOCUMENTS

| JP | 2004-064646 A | 2/2004 |
| JP | 2004-096779 A | 3/2004 |

(Continued)

OTHER PUBLICATIONS

BitTorrent (in public use since Jul. 2, 2001, as documented by Wikipedia—22 pages).*

(Continued)

*Primary Examiner* — Wing F Chan
*Assistant Examiner* — Leon Y Tseng
(74) *Attorney, Agent, or Firm* — Arent Fox LLP

(57) ABSTRACT

A computer-readable recording medium stores a data sharing program that causes a processor of a first terminal to execute a process that includes detecting a communication bandwidth used between the first terminal and a second terminal that are communicably connected in an ad-hoc network; comparing the detected communication bandwidth and a bandwidth related to a storage apparatus of the first terminal; determining an operation scheme related to data sharing of data in the storage apparatus of the first terminal and data in a storage apparatus of the second terminal, based on a comparison result obtained at the comparing; notifying the second terminal of the determined operation scheme; and executing a mounting process that enables access of the storage apparatus of the first terminal by the second terminal, based on the determined operation scheme.

17 Claims, 30 Drawing Sheets

(56) References Cited

U.S. PATENT DOCUMENTS

| | | |
|---|---|---|
| 2006/0168000 A1 | 7/2006 | Bodlaender |
| 2007/0038773 A1* | 2/2007 | White et al. .................. 709/233 |
| 2007/0049341 A1 | 3/2007 | Thoresson |
| 2007/0050829 A1 | 3/2007 | Asami et al. |
| 2007/0201423 A1 | 8/2007 | Laroia et al. |
| 2007/0206554 A1 | 9/2007 | Laroia et al. |
| 2007/0211677 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0247365 A1 | 10/2007 | Laroia et al. |
| 2007/0254596 A1 | 11/2007 | Corson et al. |
| 2009/0040996 A1 | 2/2009 | Laroia et al. |
| 2010/0020718 A1* | 1/2010 | Tabbara et al. ................ 370/254 |
| 2010/0146094 A1* | 6/2010 | Elkayam et al. ............. 709/223 |

FOREIGN PATENT DOCUMENTS

| | | |
|---|---|---|
| JP | 2006-520496 A | 9/2006 |
| JP | 2007-066061 A | 3/2007 |
| JP | 2007-531087 A | 11/2007 |
| JP | 2007-336167 A | 12/2007 |
| JP | 2007-336360 A | 12/2007 |
| JP | 2009-505539 A | 2/2009 |
| JP | 2009-527136 A | 7/2009 |

OTHER PUBLICATIONS

What is tight coupling, saved May 11, 2016, www.webopedia.com (2 pages).*

Office Action issued in Japanese Patent Application No. 2012-533826, mailed Jul. 30, 2013, 5 pages.

International Search Report issued in PCT/JP2010/066253, mailed Nov. 2, 2010, 6 pages.

* cited by examiner

FIG.6A

DL SCREEN

DESIGNATE CATEGORY

GAME
MOVIE
DRAMA
MUSIC VIDEO
MAP

FIG.6B

DL SCREEN

DESIGNATE CONTENT

77 SAMURAI WARRIORS
FLEEING SAMURAI
GOD MOTHER
FRIDAY THE 18TH
SPACE WARS

FIG.6C

DL SCREEN

"77 SAMURAI WARRIORS" DESIGNATED

DOWNLOADING ALLOCATED CONTENT

FIG.6D

DL SCREEN

DOWNLOAD OF ALLOCATED PORTION COMPLETED

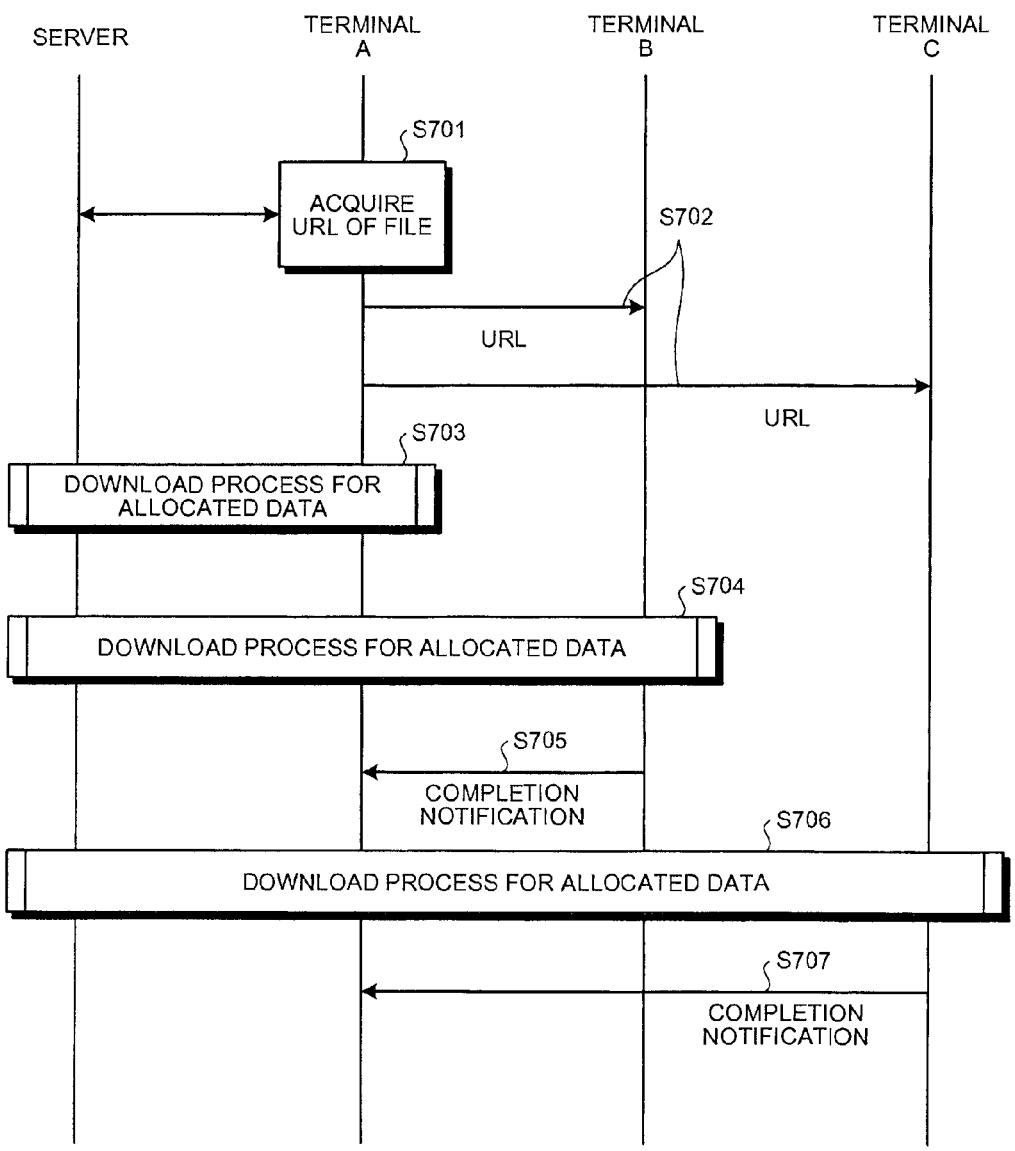

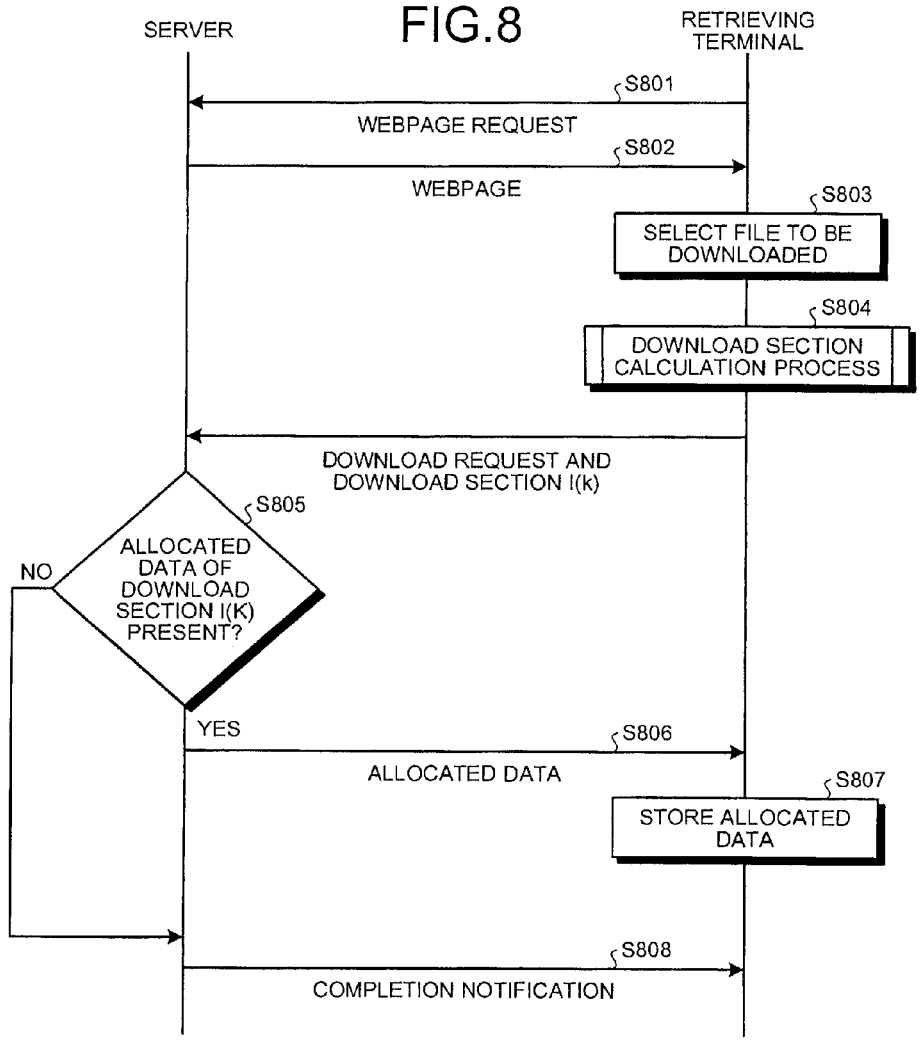

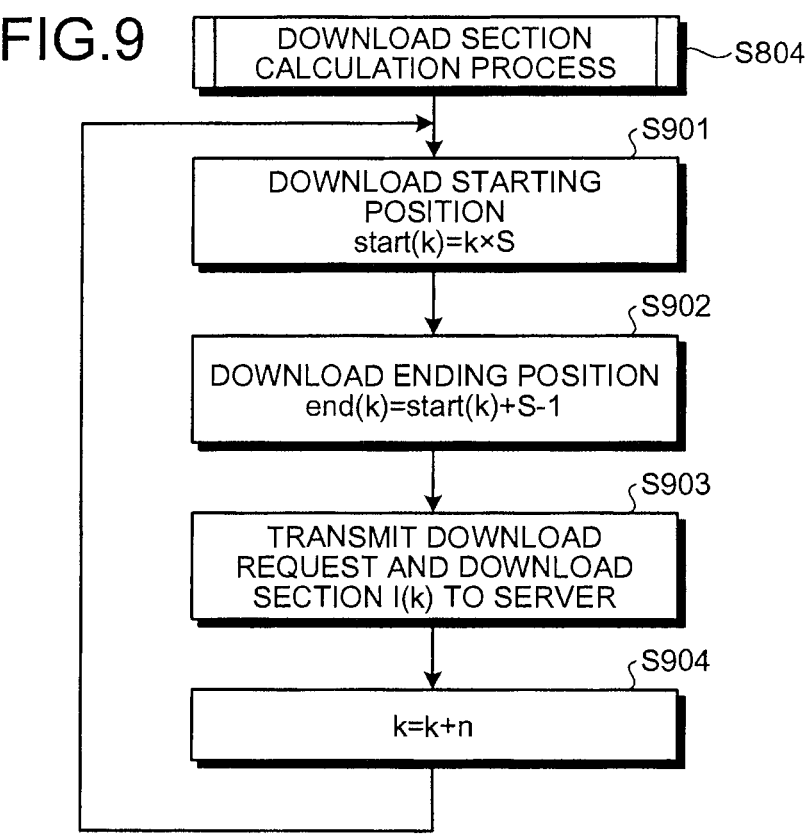

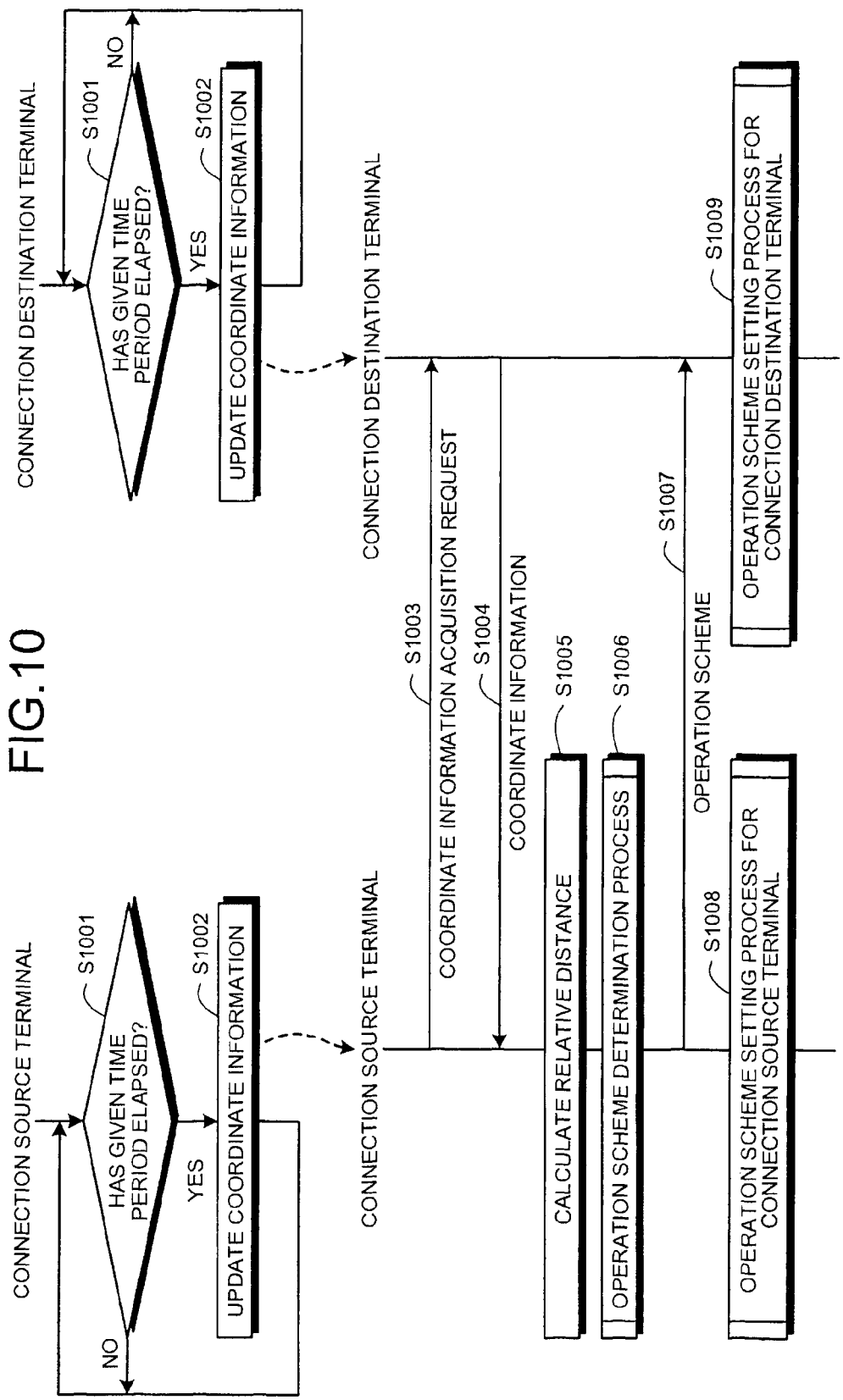

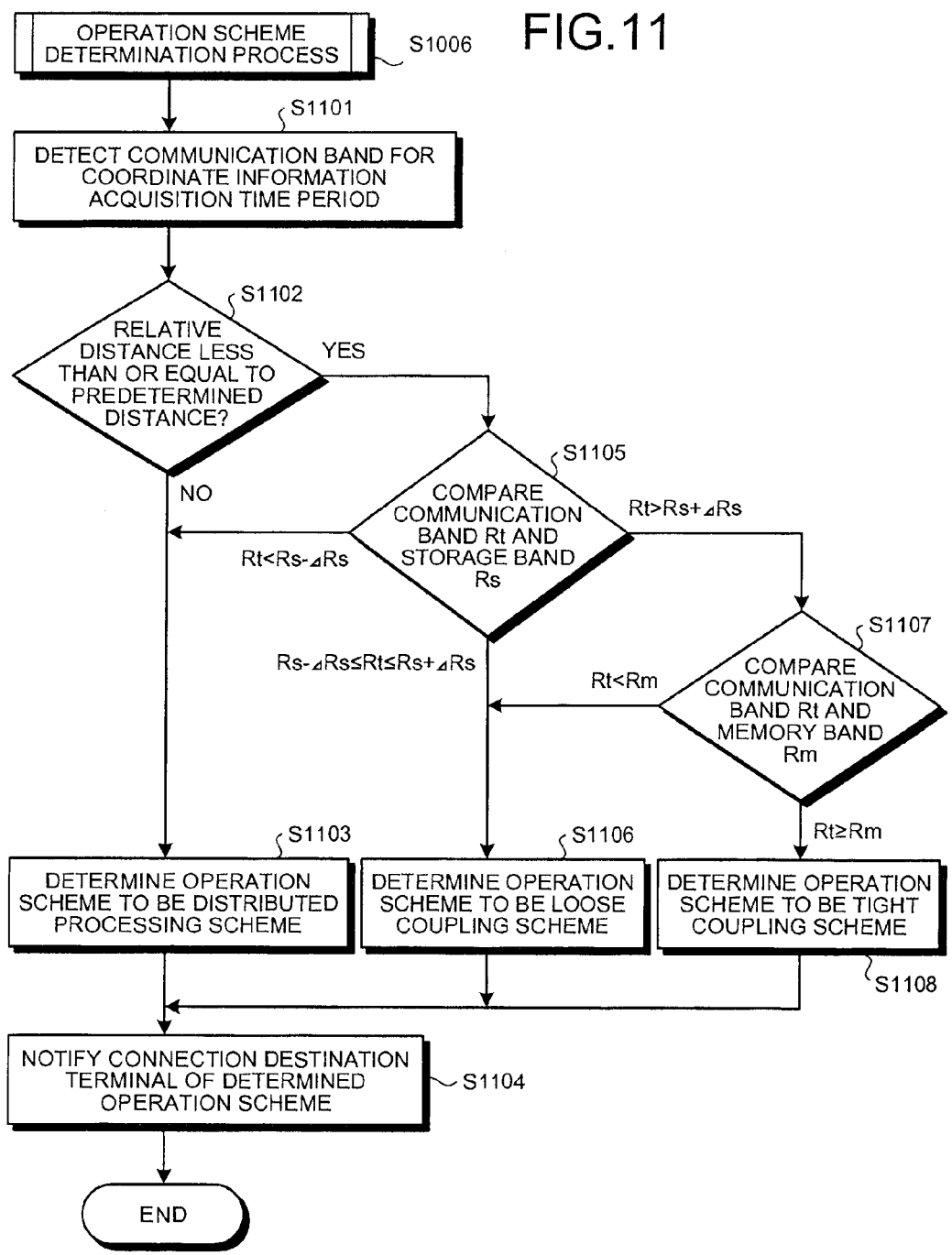

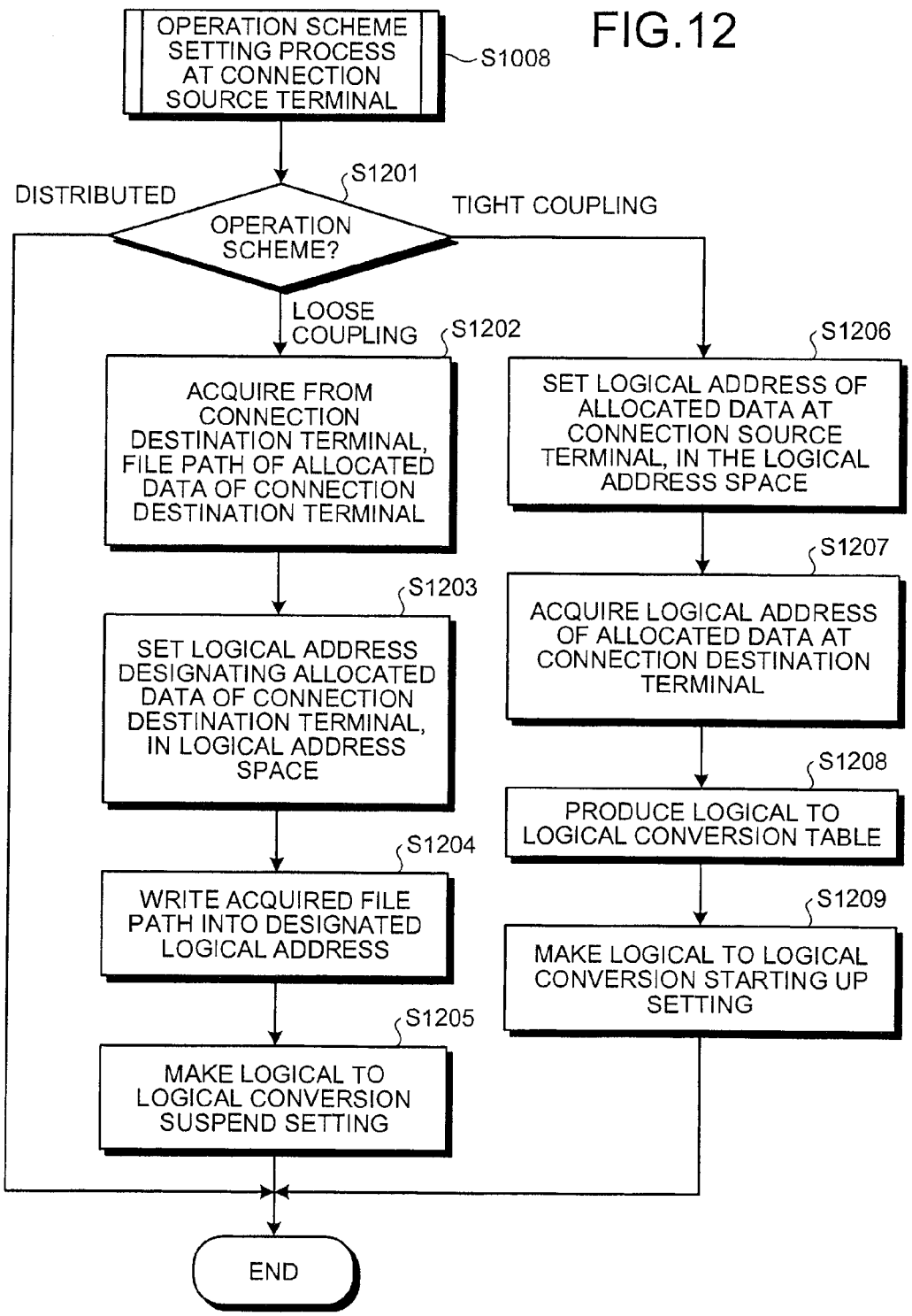

FIG.14
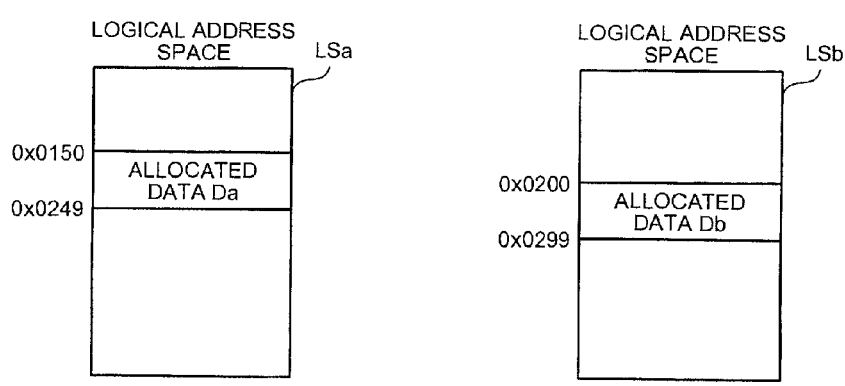
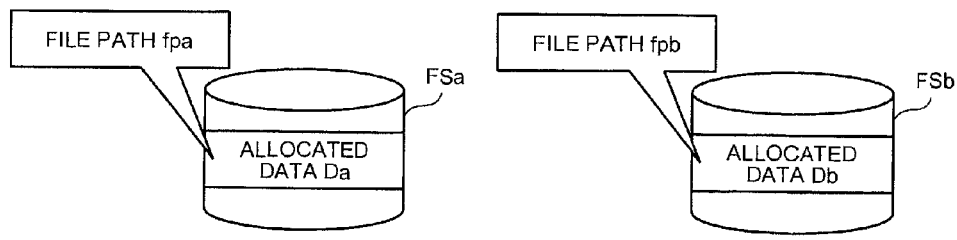

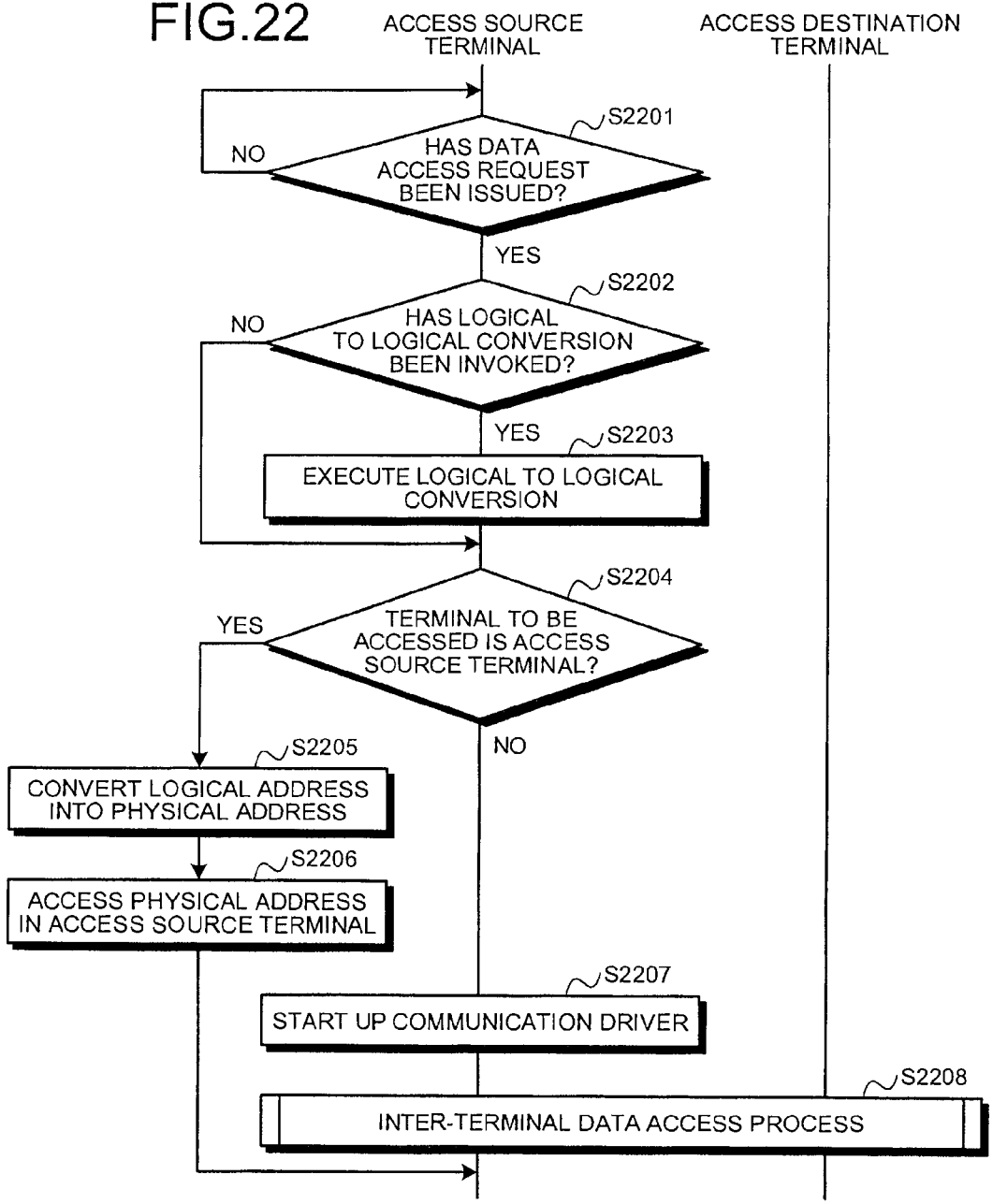

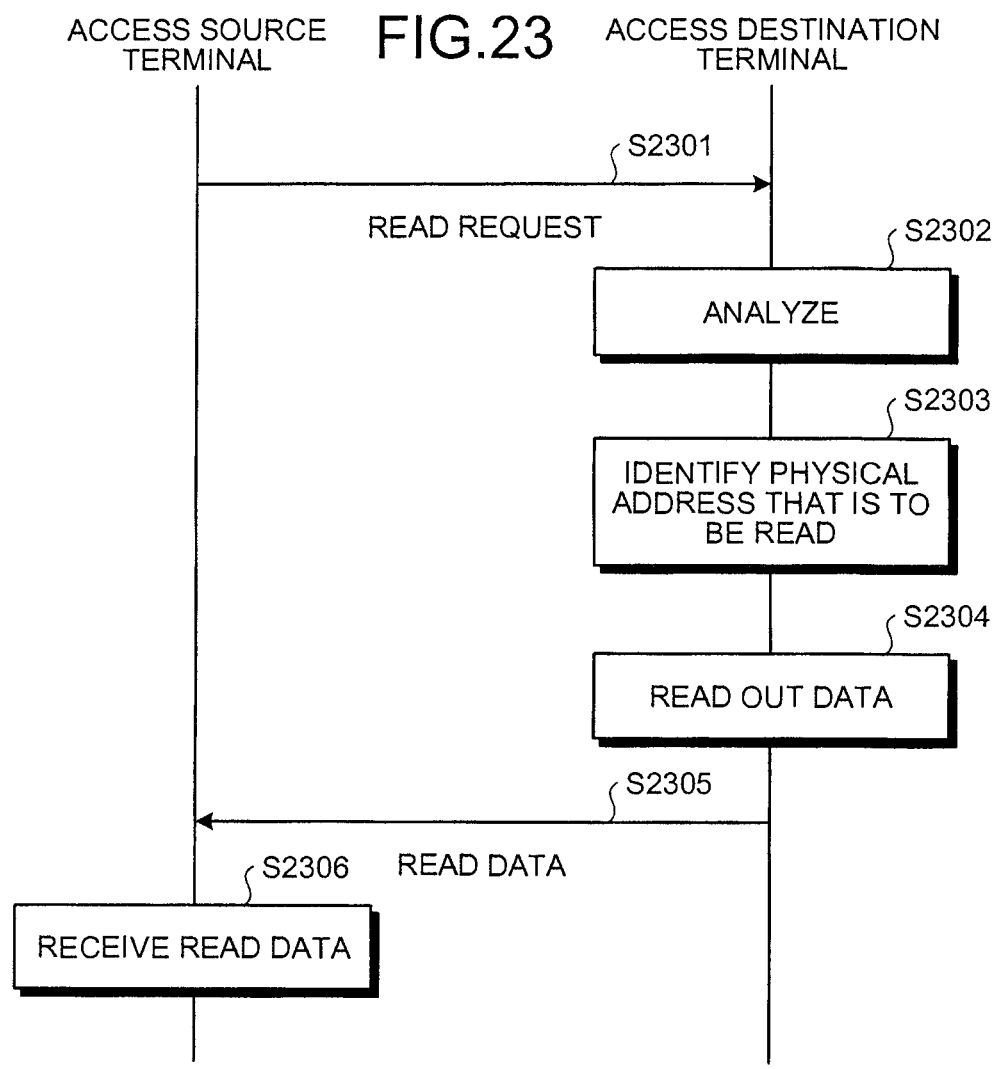

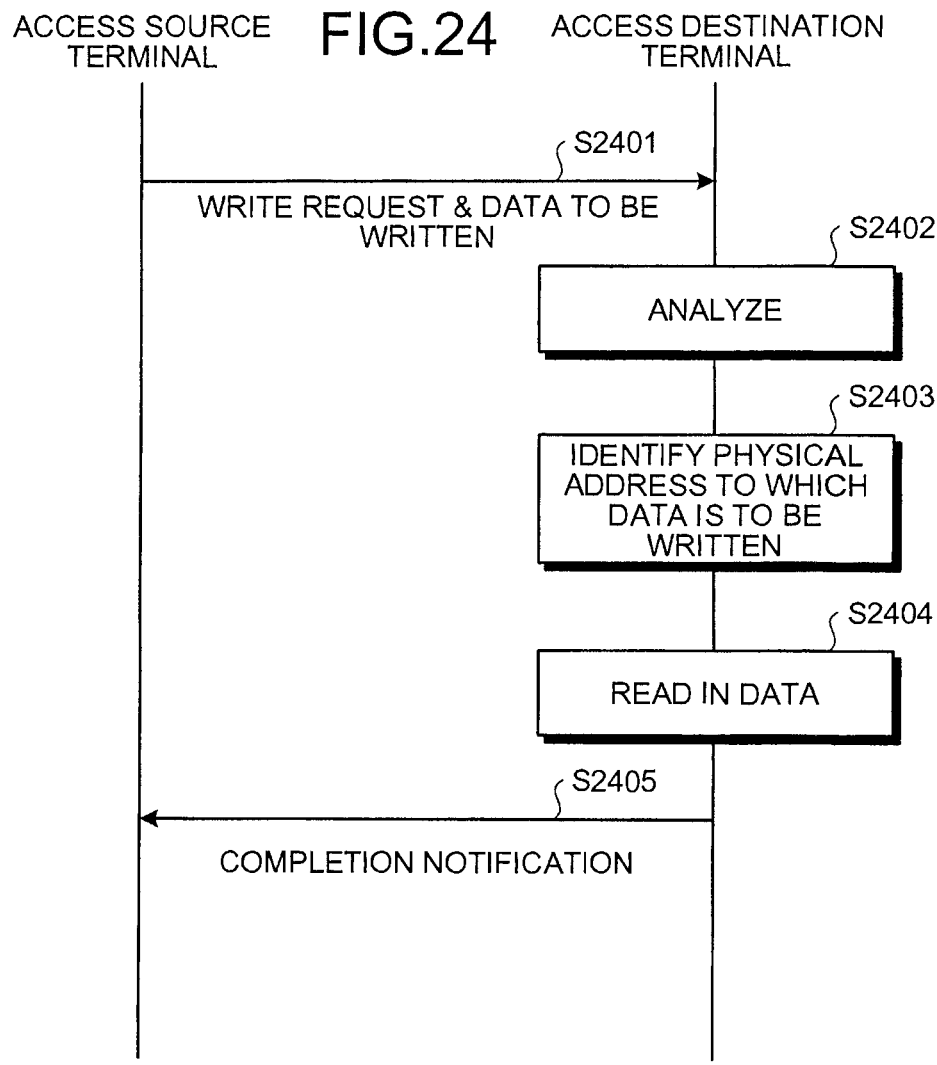

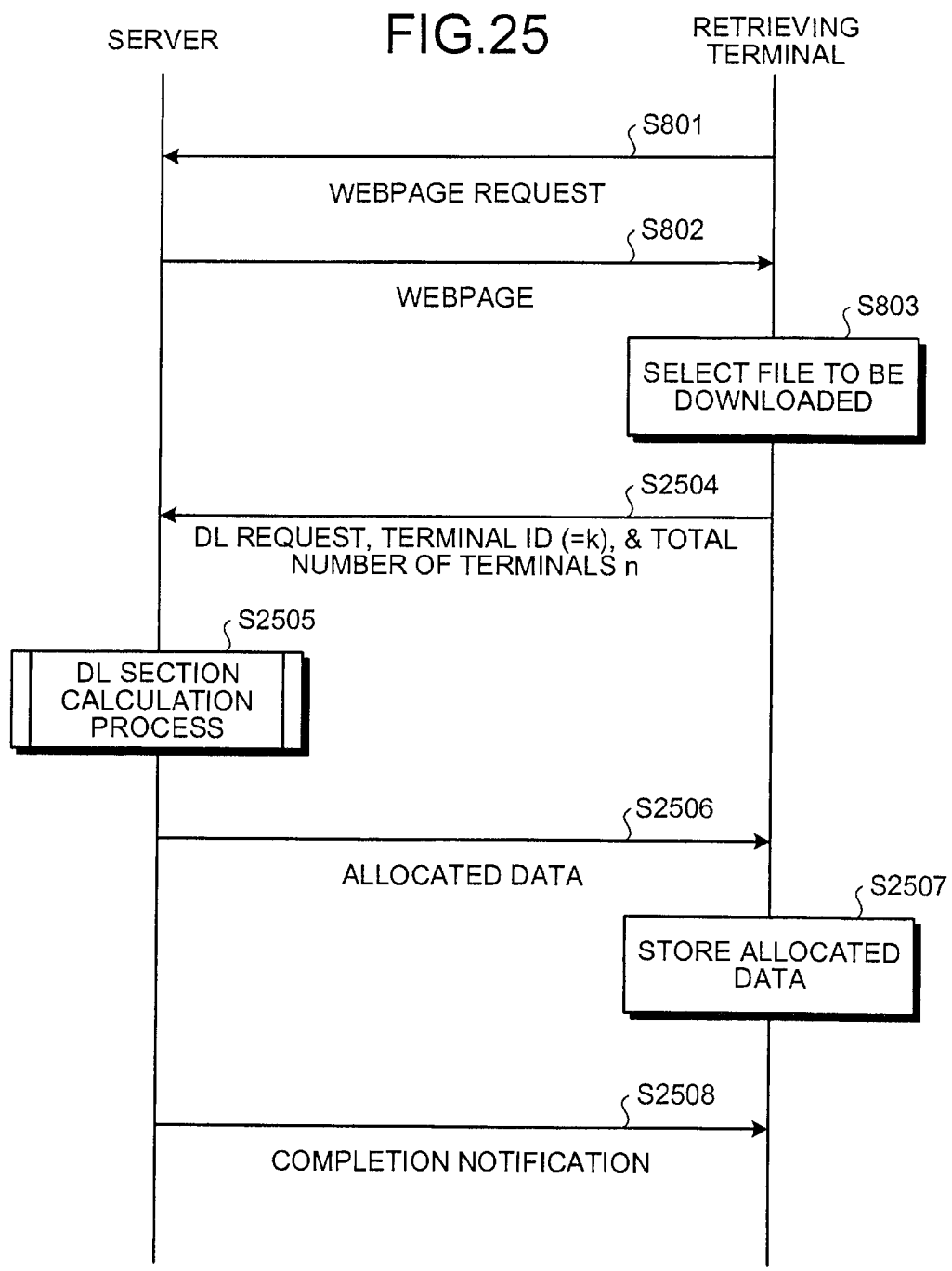

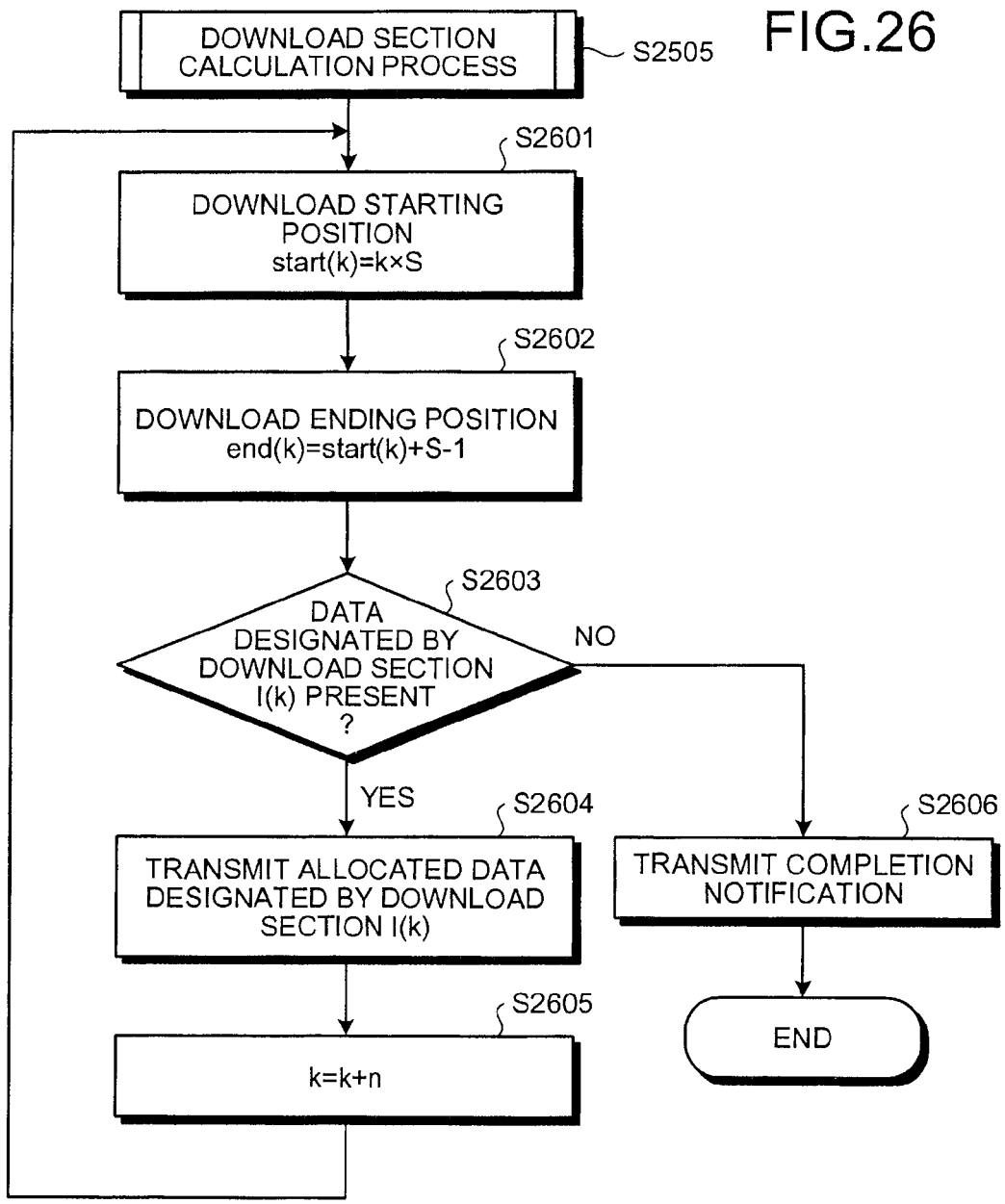

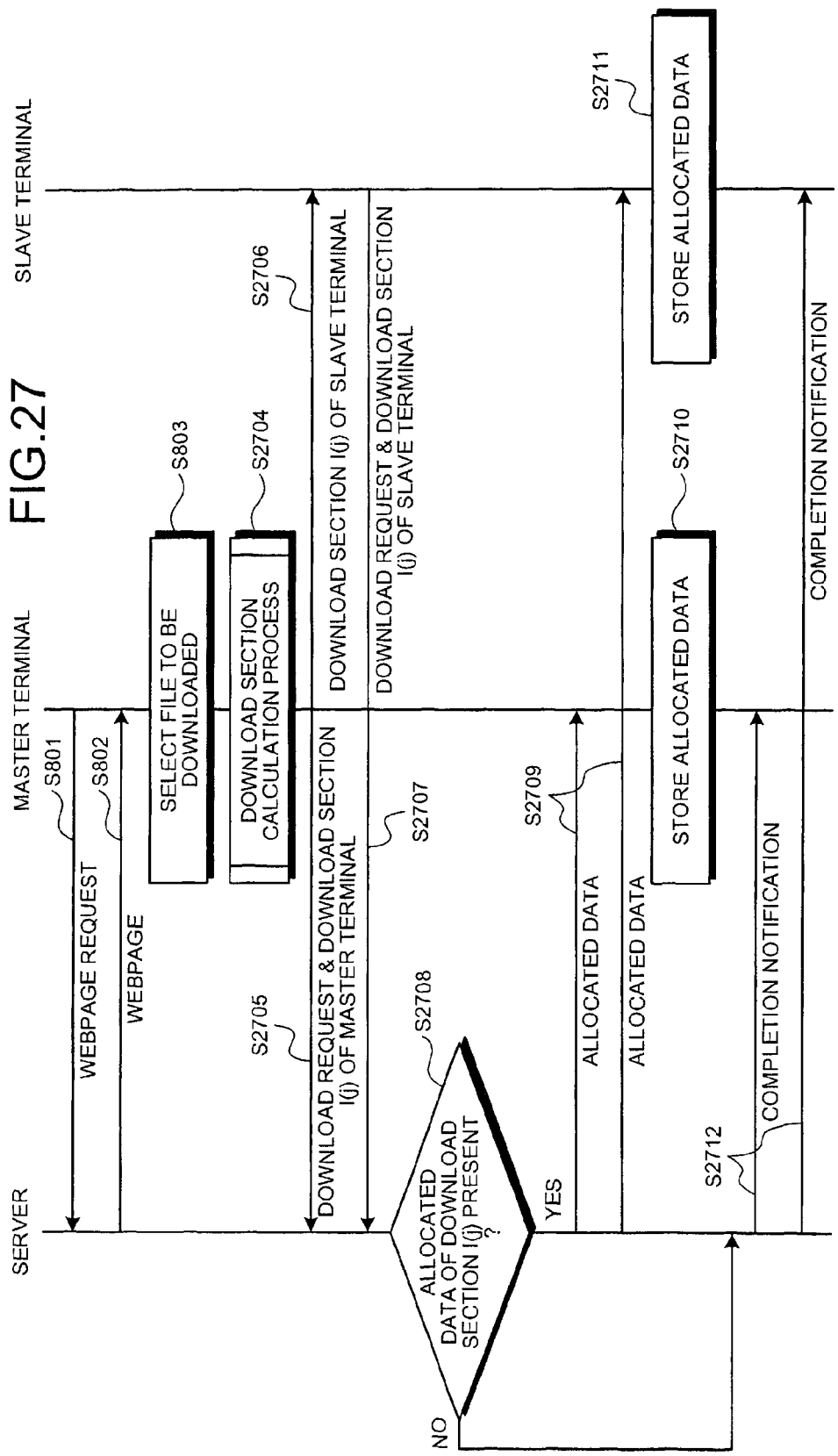

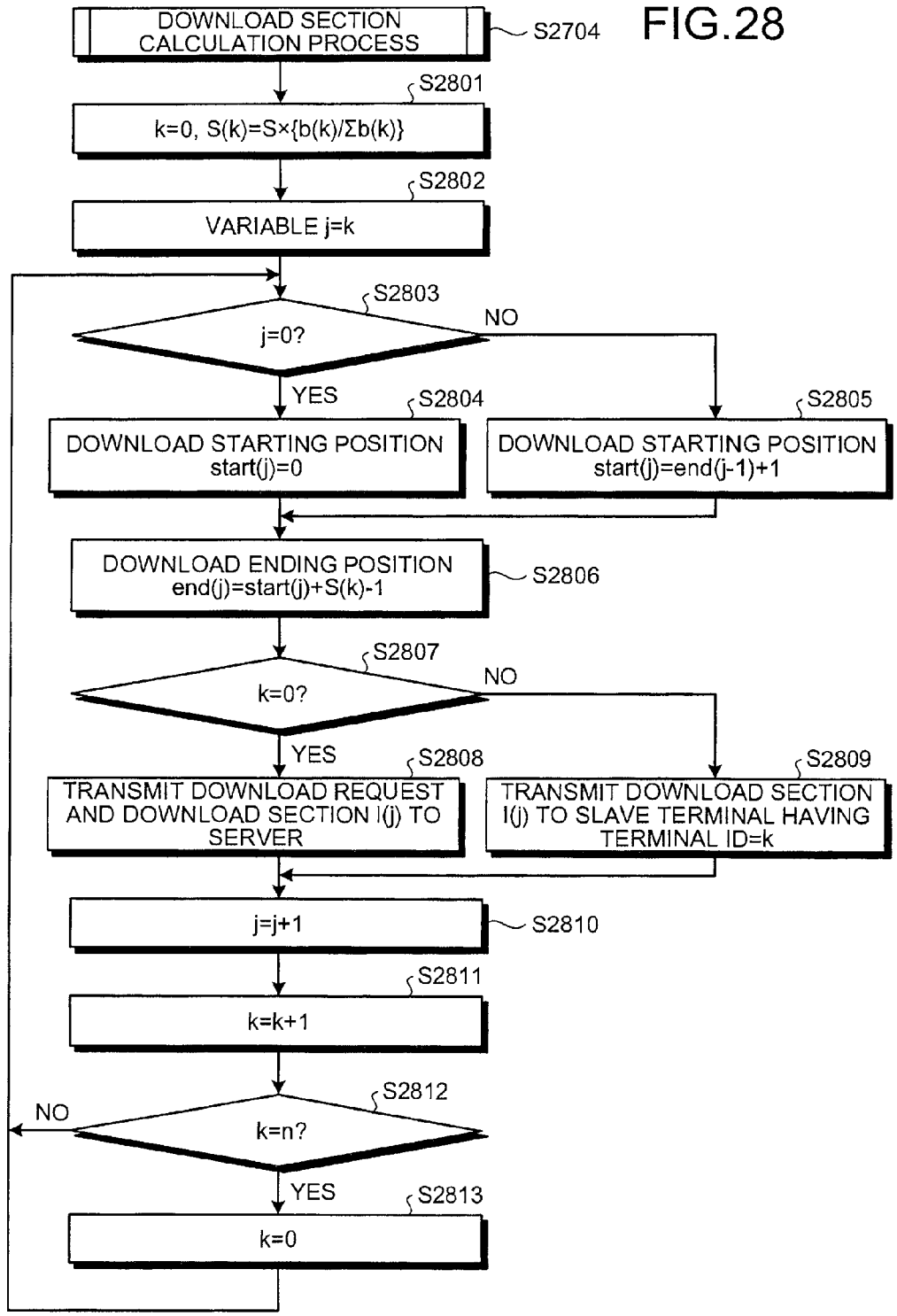

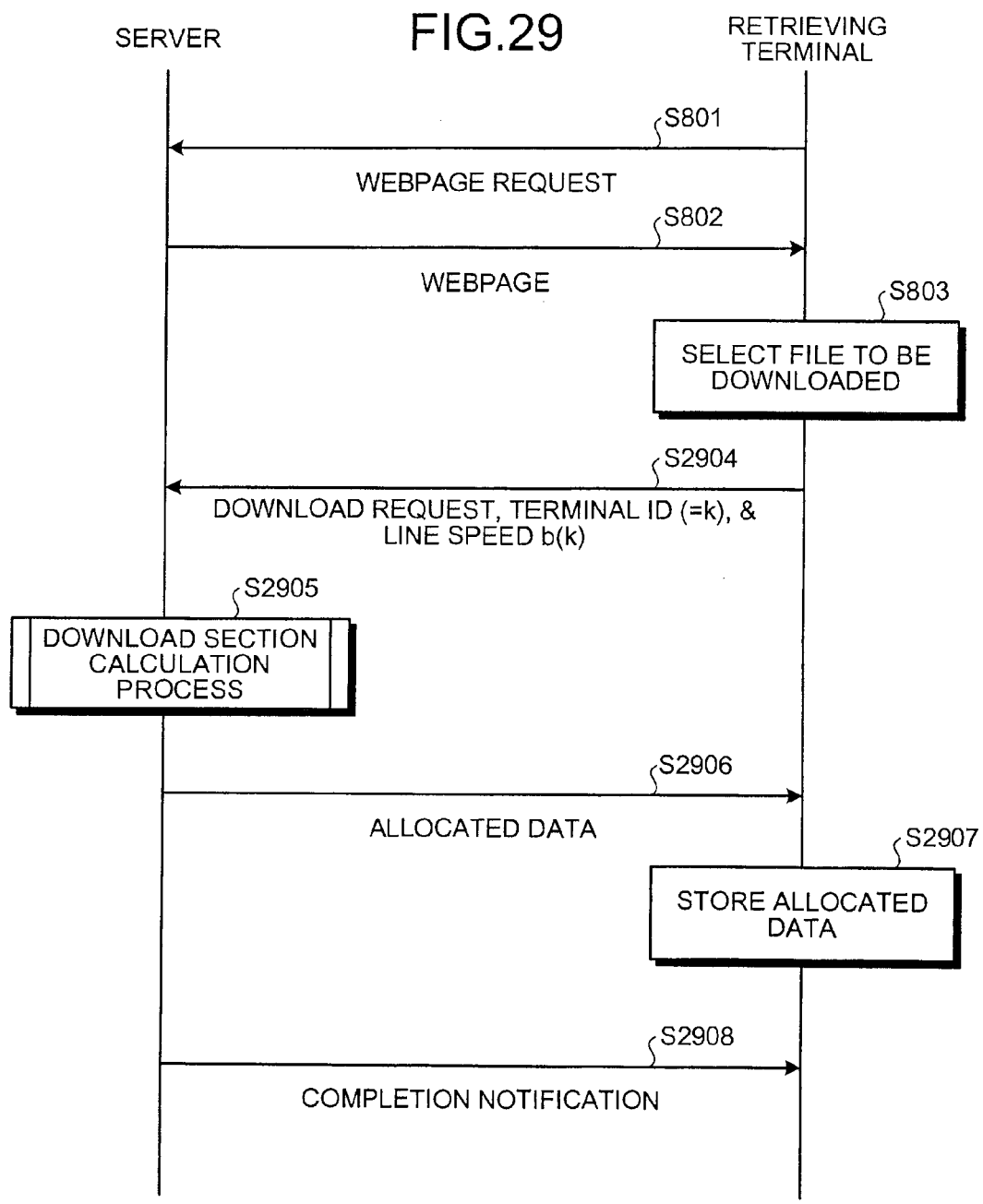

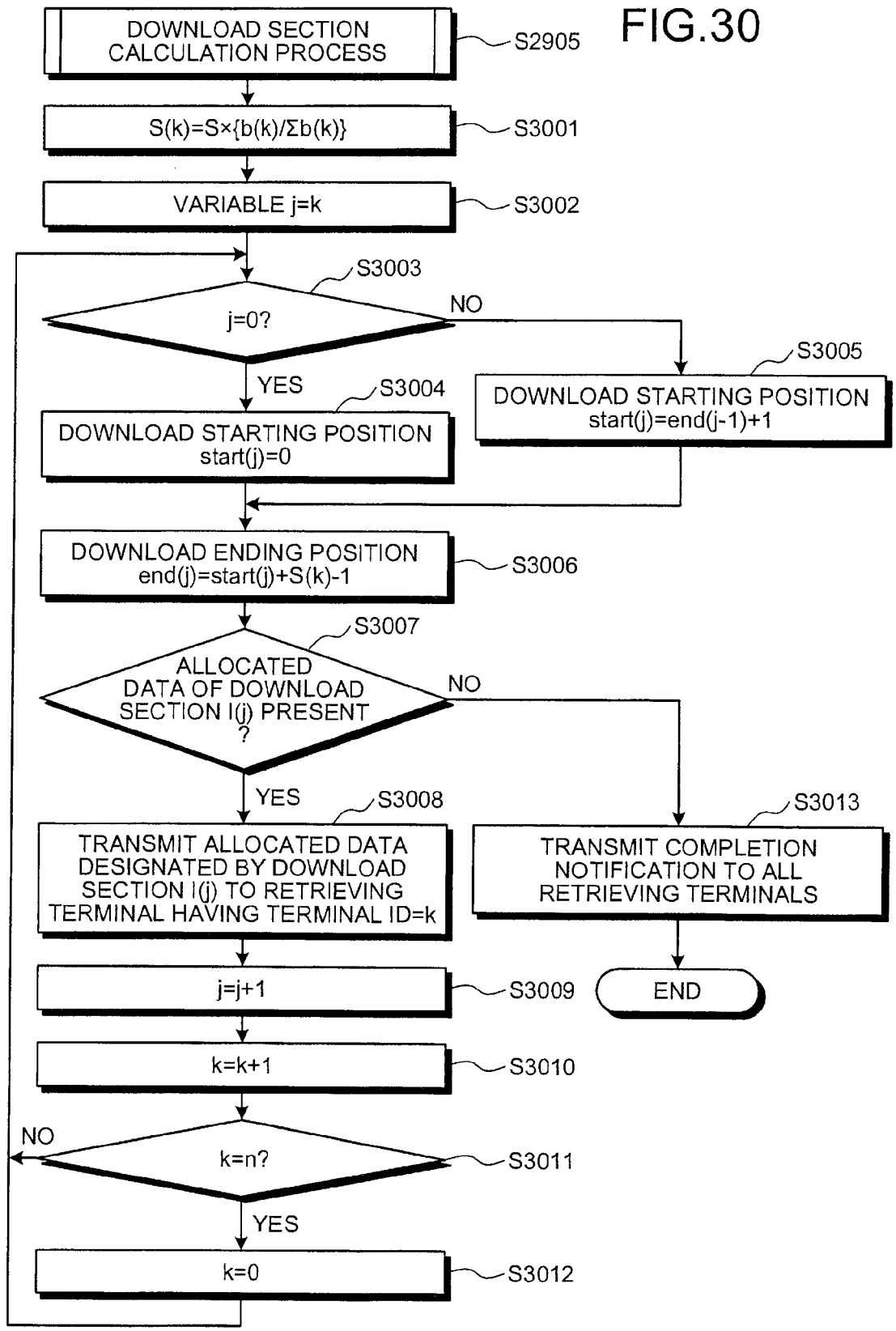

COMPUTER PRODUCT, TERMINAL, SERVER, DATA SHARING METHOD, AND DATA DISTRIBUTION METHOD

CROSS REFERENCE TO RELATED APPLICATIONS

This application is a continuation application of International Application PCT/JP2010/066253, filed on Sep. 17, 2010 and designating the U.S., the entire contents of which are incorporated herein by reference.

FIELD

The embodiments discussed herein are related to a data sharing program, a data distribution program, a terminal, a server, a data sharing method, and a data distribution method to share and distribute data.

BACKGROUND

According to a conventional technique, when the data of a digital camera is transferred to a server, the data is divided and assigned to plural digital cameras; and each of the digital cameras transfers the assigned data to the server (see, e.g., Japanese Laid-Open Patent Publication No. 2007-66061).

According to another disclosed technique, during parallel processing by a distributed-memory computer for an inquiry to parallel databases, the amount of data transferred between nodes is reduced when an access to the database of another node occurs (see, e.g., Japanese Laid-Open Patent Publication No. 2007-531087).

A technique of realizing data communication to a remote terminal when only ad-hoc communication is available and a technique of enabling data to be transferred from the closest terminal when plural mobile terminals are present respectively having the requested data have been disclosed (see, e.g., Japanese Laid-Open Patent Publication Nos. 2007-336360 and 2004-64646).

However, if data is shared among plural mobile terminals (for example, mobile terminals A to C) using the conventional techniques, when the mobile terminal A would like to use data Db retained by the mobile terminal B, the data Db needs to be transmitted from the terminal B to the terminal A. Similarly, when the mobile terminal A would like to use data Dc retained by the mobile terminal C, the data Dc needs to be transmitted from the terminal C to the terminal A.

Therefore, when a user of the mobile terminal A would like to use the data Db and Dc, the user can not access the data Db and Dc of the mobile terminals B and C from the mobile terminal A and therefore, a problem arises in that the usability of the data sharing is low.

The low usability of the data sharing also occurs when the mobile terminal B uses data Da retained by the mobile terminal A and the data Dc retained by the mobile terminal C and when the mobile terminal C uses the data Da retained by the mobile terminal A and the data Db retained by the mobile terminal B.

When the data Da to Dc are present in a server, accessing the server through a mobile telephone network enables each of the mobile terminals A to C to download the data Da to Dc.

However, the bandwidth for a base station in the mobile telephone network is determined and is shared by mobile terminals connected to the base station. Therefore, the bandwidth used by each of the mobile terminals decreases as the mobile terminals connected to the base station increases.

Thus, when all the data Da to Dc are downloaded by each of the mobile terminals A to C, a problem arises in that the download time period becomes long.

Consequent to the mobile terminals A to C each downloading all the data Da to Dc, when the total amount of the data Da to Dc is great, a problem arises in that the mobile terminals A to C cannot download the data Da to Dc due to insufficient memory capacity.

SUMMARY

According to an aspect of an embodiment, a computer-readable recording medium stores a data sharing program that causes a processor of a first terminal to execute a process that includes detecting a communication bandwidth used between the first terminal and a second terminal that are communicably connected in an ad-hoc network; comparing the detected communication bandwidth and a bandwidth related to a storage apparatus of the first terminal; determining an operation scheme related to data sharing of data in the storage apparatus of the first terminal and data in a storage apparatus of the second terminal, based on a comparison result obtained at the comparing; notifying the second terminal of the determined operation scheme; and executing a mounting process that enables access of the storage apparatus of the first terminal by the second terminal, based on the determined operation scheme.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 6A, 6B, 6C, and 6D are explanatory diagrams of download screens on a master terminal A;

FIG. 7 is an explanatory diagram of a sequence of a download process;

FIG. 8 is a sequence diagram depicting details of the download process (steps S703, S704, and S706) for allocated data;

FIG. 9 is a flowchart depicting details of the process procedure of a download section calculation process (step S804);

FIG. 10 is an explanatory diagram of an operation scheme setting sequence;

FIG. 11 is a flowchart depicting details of the process procedure of an operation scheme determination process (step S1006) depicted in FIG. 10;

FIG. 12 is a flowchart depicting details of the process procedure of an operation scheme setting process (step S1008) executed by a connection source terminal depicted in FIG. 10;

FIG. 14 is an explanatory diagram of a state where terminals A and B respectively download allocated data Da and Db;

FIG. 22 is an explanatory diagram of a sequence of a data access process executed between terminals;

FIG. 23 is a sequence diagram (Part I) depicting details of the process procedure of the data access process executed between terminals (step S2208) depicted in FIG. 22;

FIG. 24 is a sequence diagram (Part II) depicting details of the process procedure of the data access process executed between terminals (step S2208) depicted in FIG. 22;

FIG. 25 is a sequence diagram depicting details of the process procedure of an allocated data download process (steps S703, S704, and S706);

FIG. 26 is a flowchart depicting details of the process procedure of a download section calculation process (step S2505) depicted in FIG. 25;

FIG. 27 is a sequence diagram depicting details of the process procedure of the allocated data download process (steps S703, S704, and S706);

FIG. 28 is a flowchart depicting details of the process procedure of the download section calculation process (step S2704) depicted in FIG. 27;

FIG. 29 is a sequence diagram depicting details of the process procedure of the download process (steps S703, S704, and S706) of the allocated data; and FIG. 30 is a flowchart depicting details of the process procedure of the download section calculation process (step S2905) depicted in FIG. 29.

DESCRIPTION OF EMBODIMENTS

Embodiments of the present invention will be described in detail with reference to the accompanying drawings.

Figure 1:
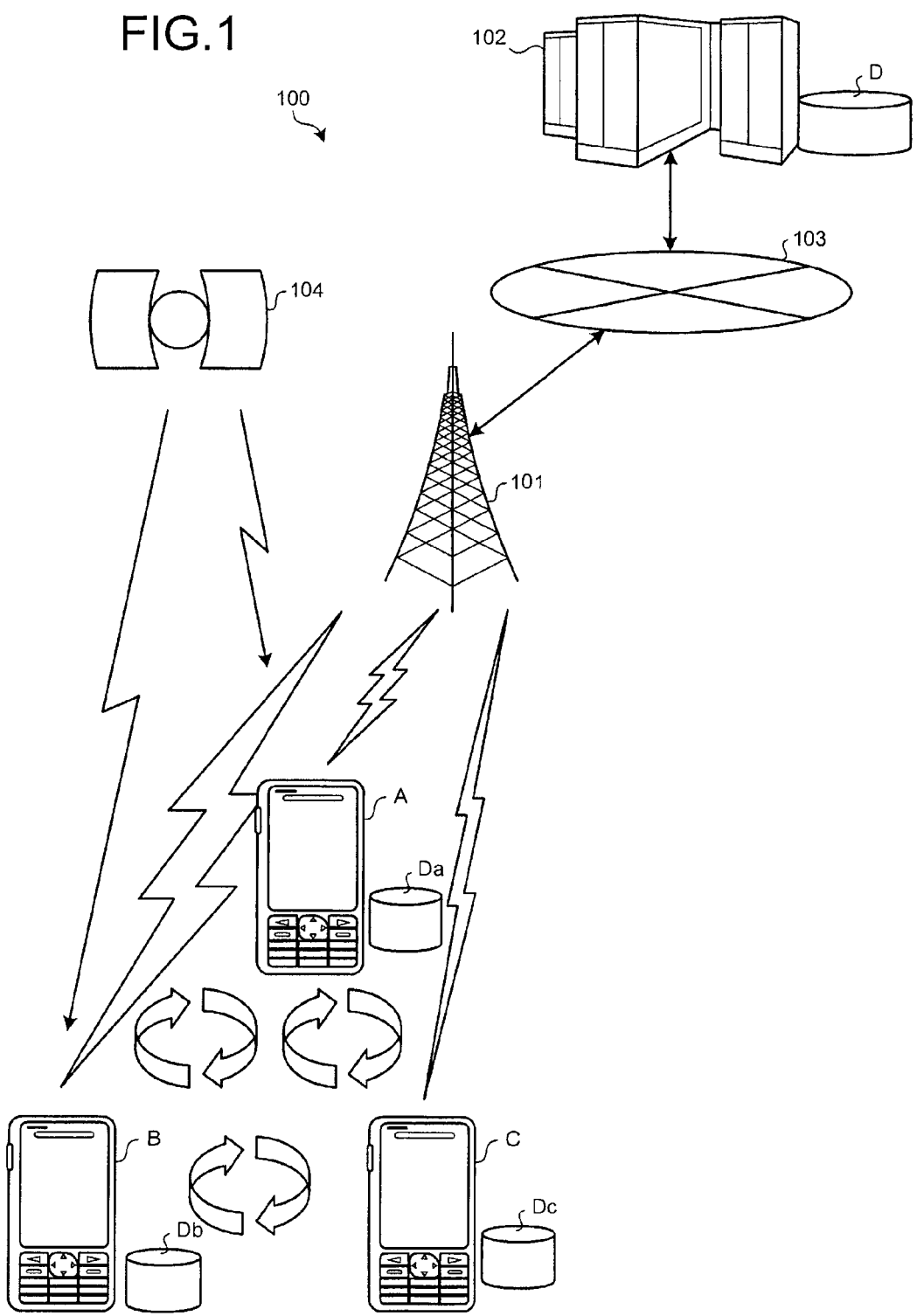
FIG. 1 is an explanatory diagram of an example of a configuration of a data sharing system according to an embodiment of the present invention.

FIG. 1 is an explanatory diagram of an example of a system configuration of a data sharing system according to an embodiment of the present invention. In a data sharing system 100 of FIG. 1, plural (three as an example) terminals A to C are communicably connected to a server 102 through a base station 101 and a network 103. Each of the terminals A to C is a mobile computer capable of wireless communication and is, for example, a mobile telephone, a smartphone, an electronic dictionary, a tablet terminal, or a mobile game machine.

When the server 102 is present in a mobile telephone network in the network 103, each of the terminals A to C accesses the server 102 through the base station 101 and the mobile telephone network. When the server 102 is present in the Internet network in the network 103, each of the terminals A to C accesses the server 102 through the base station 101, the mobile telephone network, and the Internet network. Each of the terminals A to C can establish ad-hoc communication among the terminals. Each of the terminals A to C can also acquire information concerning its current position by receiving a signal from a GPS satellite 104.

The server 102 has data D such as a video image, a game, or a map; and in response to a download request from any one of the terminals A to C, downloads the data D to the terminal that is the source of the download request. In FIG. 1, the server 102 executes a receiving process for the download request and a process of storing and downloading the data. However, the servers 120 different from each other may separately execute the receiving process for the download request and the process of storing and downloading the data.

In this case, a first server executes the receiving process for the download request and transmits the received download request to a second server that executes the process of storing therein and downloading the data D. The second server identifies the download request source and the data to be downloaded according to the received download request, and downloads the data to be downloaded to the download request source terminal.

In the data sharing system 100, the terminals A to C divide and download the data D from the server 102. The data downloaded by each of the terminals A to C will be referred to as "allocated data". The allocated data Da to Dc are respectively different data. Using ad-hoc communication, each of the terminals A to C can access the allocated data of the other terminals. For example, the terminal A can access the allocated data Db and Dc using the ad-hoc communication.

Thus, each of the terminals A to C can access the allocated data stored by the other terminals because the terminals A to C are mutually connected by the ad-hoc communication. The terminals A to C do not need to respectively download all the data Da to Dc and therefore, reduction of the download time period can be facilitated and occurrences of the memory capacity shortage can be reduced.

Figure 2:
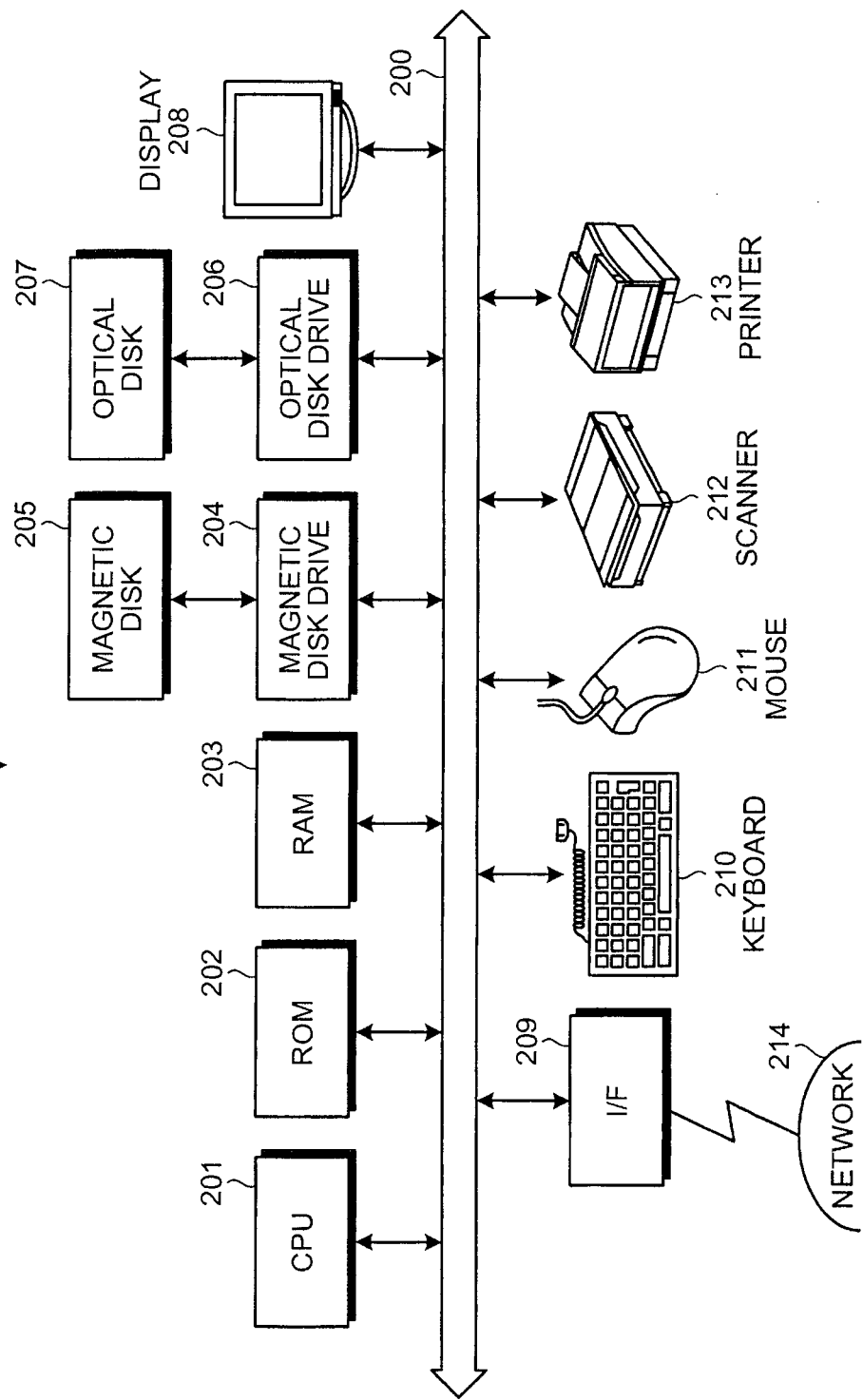
FIG. 2 is a block diagram of a hardware configuration of a server.

FIG. 2 is a block diagram of a hardware configuration of the server 102 according to the embodiment. As depicted in FIG. 2, the server 102 includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 200.

The CPU 201 governs overall control of the server 102. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores data written under control of the magnetic disk drive 204.

The optical disk drive 206, under the control of the CPU 201, controls the reading and writing of data with respect to the optical disk 207. The optical disk 207 stores data written under control of the optical disk drive 206, the data being read by a computer.

The display 208 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to a network 214 such as a local area network (LAN), a wide area network (WAN), and the Internet through a communication line and is connected to other apparatuses through the network 214. The I/F 209 administers an internal interface with the network 214 and controls the input/output of data from/to external apparatuses. For example, a modem or a LAN adaptor may be employed as the I/F 209.

The keyboard 210 includes, for example, keys for inputting letters, numerals, and various instructions and performs the input of data. Alternatively, a touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

The scanner 212 optically reads an image and takes in the image data into the server 102. The scanner 212 may have an optical character reader (OCR) function as well. The printer 213 prints image data and text data. The printer 213 may be, for example, a laser printer or an ink jet printer.

Figure 3:
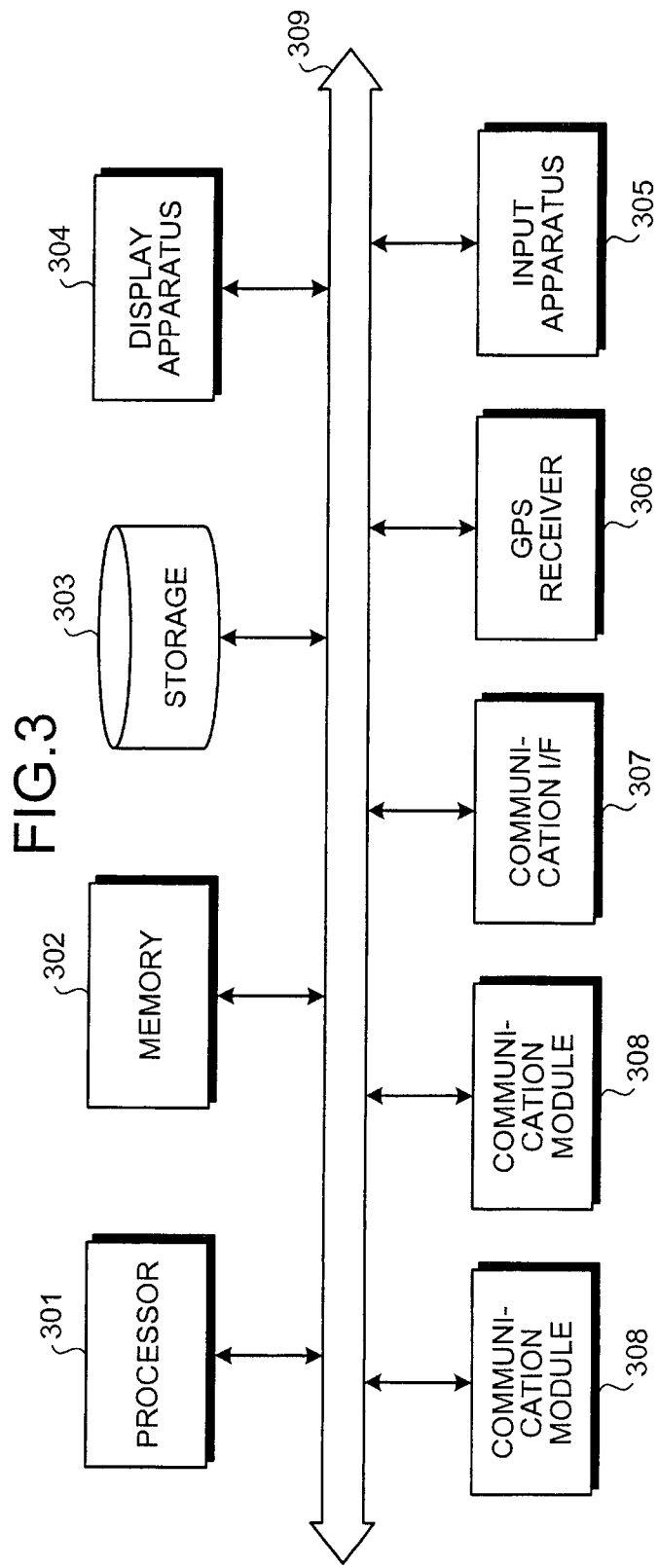
FIG. 3 is a block diagram of an example of hardware configuration of a terminal.

FIG. 3 is a block diagram of an example of hardware configuration of the terminal. In FIG. 3, each of the terminals A to C includes a processor 301, memory 302, storage 303, a display apparatus 304, an input apparatus 305, a GPS receiver 306, a communication I/F 307, and plural (two in FIG. 3) communication modules 308, respectively connected by a bus 309.

The processor 301 governs overall control of the terminal. The memory 302 is a main storage apparatus that is used as a work area of the CPU 201. Volatile memory or non-volatile memory can be employed as the memory 302. The storage 303 is an auxiliary storage apparatus that stores an OS, applications, and other programs as well as various types of data, and file systems. A non-volatile memory or a hard disk can be employed as the storage 303.

The display apparatus 304 is a display that displays data such as a document, an image, and functional information in addition to a cursor, an icon, or a tool box. The input apparatus 305 inputs characters, numbers, various instructions, etc., according to user operation. A keyboard, a numeric keypad, a touch panel, etc., is employed as the input apparatus 305.

The GPS receiver 306 receives signals from the GPS satellite 104 and acquires information concerning the current position of the terminal. The communication I/F 307 is an interface that connects the terminal to the mobile telephone network through the base station 101 and communicably connects the terminal to the server 102 through the network 103 depicted in FIG. 1. The communication modules 308 are respectively interfaces to execute the ad-hoc communication with the other terminals. In FIG. 3, two communication modules 308 are prepared as an example and therefore, the terminal can execute the ad-hoc communication simultaneously with up to two terminals.

The number of communication modules 308 may be three or more. When plural terminals mutually execute the ad-hoc communication, each of the terminals needs (the number of terminals−1) communication modules 308. For example, when five terminals mutually execute the ad-hoc communication simultaneously, each of the terminals needs four (=5−1) communication modules 308.

Mutual connection among the terminals will be described. In the embodiment, a terminal executes a master declaration of the plural terminals that share the data. The terminal executing the master declaration (a master terminal) executes a connection process for the ad-hoc communication with each of the other terminals. The connection process for the ad-hoc communication is not yet completed among the rest of the terminals except the master terminal and therefore, the rest of the terminals each execute the connection process for the ad-hoc communication according to an instruction from the master terminal.

Figure 4:
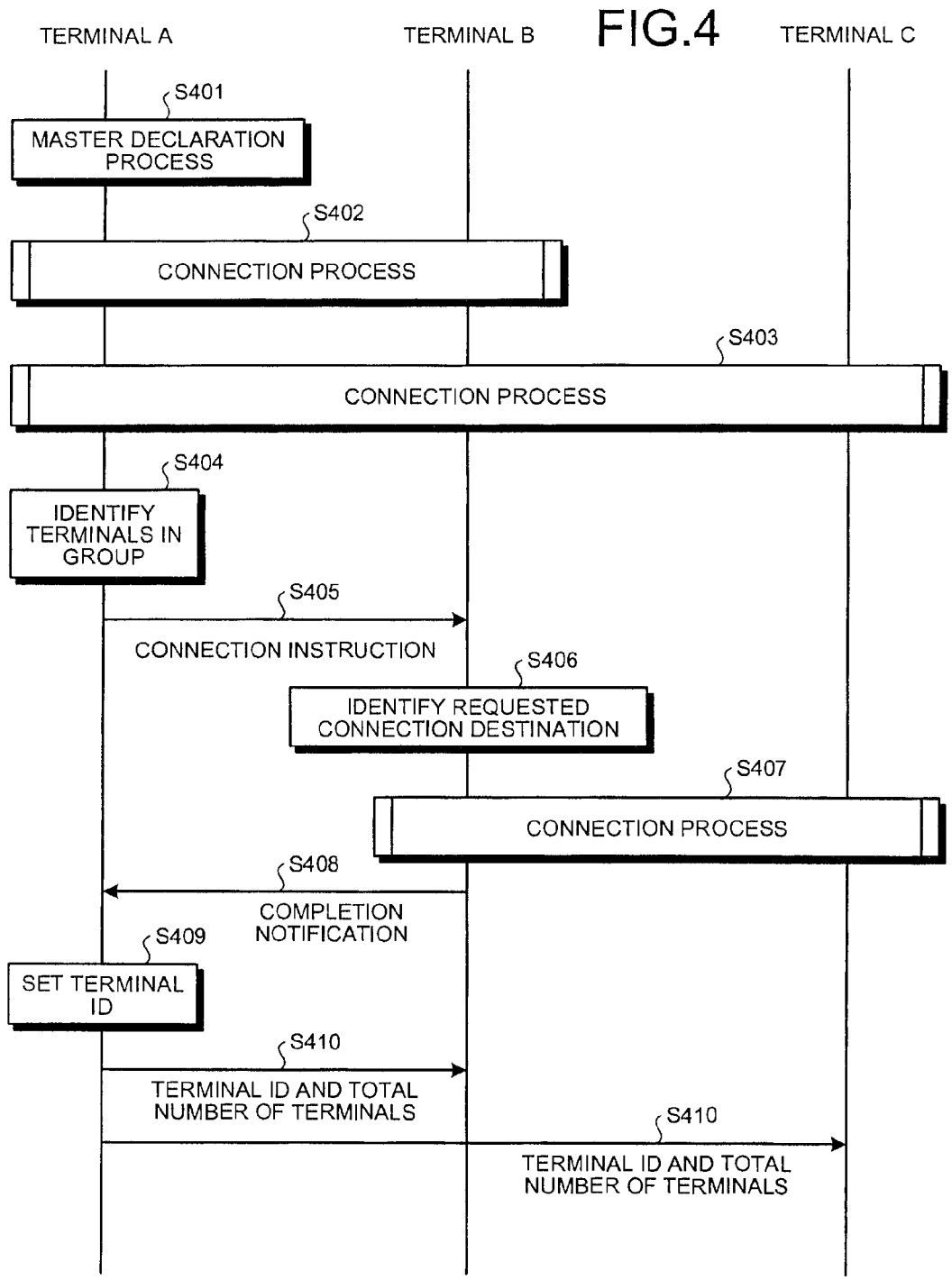
FIG. 4 is an explanatory diagram of a sequence of a connection process for ad-hoc communication.

FIG. 4 is an explanatory diagram of the sequence of the connection process for the ad-hoc communication. In FIG. 4, an example will be taken where the terminal A operates as the master terminal. However, the terminal B or C may operate as the master terminal. The terminal A executes a master declaration process (step S401). The terminal A operating as the master terminal consequent to the master declaration process (master terminal A) executes the connection processes to connect to the terminals B and C (steps S402 and S403). The details of each of the connection processes to connect to the terminals B and C (steps S402 and S403) will be described later.

Thereafter, the master terminal A identifies the terminals in a group (step S404). The group is a group of terminals that share data and, for example in FIG. 4, includes the master terminal A and the terminals B and C for which the master terminal A can complete the connection processes for the ad-hoc communication.

The master terminal A identifies the terminals B and C that are connection destinations to which connection is to be made by the connection process. This identification is executed to cause the connection destination terminals B and C to mutually execute the connection processes for the ad-hoc communication between the terminals B and C. Thereafter, the master terminal A notifies the terminal B among the connection destination terminals B and C, of a connection instruction for the ad-hoc communication with the terminal C (step S405).

The terminal B receives the notification of the connection instruction and identifies the requested connection destination (step S406). In this case, the requested connection destination is only the terminal C and therefore, the terminal B executes the connection process to connect the terminal B to the terminal C (step S407). The details of this connection process (step S407) will also be described later.

Assuming that a terminal D not depicted is identified as a terminal in the group, the requested connection destination terminals at step S406 are the terminals C and D, and the terminal B executes the connection processes to connect the terminal B to the terminals C and D. In this case, the terminal A also notifies the terminal C of the connection instruction (step S405). The terminal C identifies the terminal D as a requested connection destination by executing requested destination identification (step S406). The terminal C executes the connection process to connect the terminal C to the terminal D (step S407).

When the terminal B completes the connection process to connect the terminal B to the terminal C, the terminal B transmits completion notification to the master terminal A (step S408). The master terminal A receives the completion notification and sets a terminal ID for each of the terminals in the group (step S409). The terminal ID is unique identification information allocated to each of the terminals in the group. It is assumed that the terminal ID is a serial number starting from "0" with that of the master terminal to be "0"

such as, for example, "0" for the terminal ID of the master terminal A, "1" for that of the terminal B, and "2" for that of the terminal C.

The master terminal A transmits the terminal ID and the total number of terminals to each of the terminals B and C using the ad-hoc communication (step S410). The total number of terminals is the total number of terminals in the group. In this case, the terminals A to C are present and therefore, the total number of terminals is three. Hence, the master terminal A transmits "1" as the terminal ID and "3" as the total number of terminals to the terminal B and "2" as the terminal ID and "3" as the total number of terminals to the terminal C.

Figure 5:
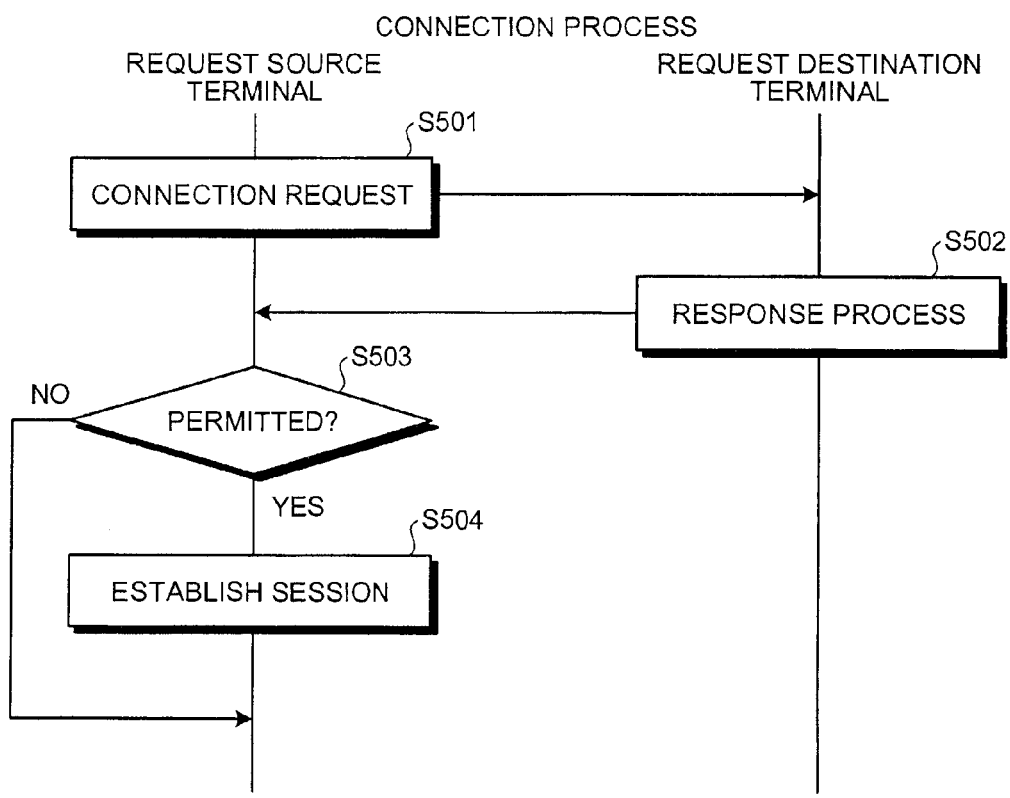
FIG. 5 is an explanatory diagram depicting details of the connection process (steps S402, S403, and S407) depicted in FIG. 4.

FIG. 5 is an explanatory diagram depicting details of the connection process (steps S402, S403, and S407) depicted in FIG. 4. In FIG. 5, the terminal that requests the connection is referred to as "request source terminal"; and the terminal to be the requested connection destination is referred to as "request destination terminal". Therefore, at step S402, the request source terminal is the master terminal A and the request destination terminal is the terminal B. At step S403, the request source terminal is the master terminal A and the request destination terminal is the terminal C. At step S407, the request source terminal is the terminal B and the request destination terminal is the terminal C.

The request source terminal transmits the connection request to the request destination terminal (step S501). At steps S402 and S403, the master declaration process (step S401) executed by the master terminal A is the trigger for the connection request. At step S407, identification of the requested destination (step S406) is the trigger for the connection request.

When the request destination terminal receives the connection request, the request destination terminal executes a response process (step S502). The request destination terminal transmits to the request source terminal, notification of connection permission/denial for the ad-hoc communication.

The request source terminal receives the notification of connection permission/denial from the request destination terminal and determines whether the connection for the ad-hoc communication is permitted (step S503). If the request source terminal determines that the connection is permitted (step S503: YES), a session is established (step S504) and the ad-hoc communication is enabled between the connection source terminal and the connection destination terminal. On the other hand, if the request source terminal determines that the connection is not permitted (step S503: NO), no session is established. In this case, the connection request is retried again for the same request destination terminal or is retried changing the request destination terminal to another terminal.

A download process executed by each of the terminals will be described. In the embodiment, the data to be downloaded is divided corresponding to the total number of terminals and downloaded by the terminals. The data downloaded by each of the terminals is referred to as "allocated data". The master terminal A determines which data is downloaded, by accessing the server 102.

FIGS. 6A, 6B, 6C, and 6D are explanatory diagrams of download screens on the master terminal A. FIG. 6A depicts a screen for designating a category of a content to be downloaded. For example, it is assumed that "MOVIE" is selected in FIG. 6A. FIG. 6B is a transitional screen for the case where "MOVIE" is selected. After "MOVIE" is selected, content that is desired to be downloaded is selected from various types of content. It is assumed that "77 SAMURAI WARRIORS" is selected as an example.

The download screen transitions to the screen depicted in FIG. 6C. The allocated data of the master terminal A is downloaded in FIG. 6C. When the downloading is completed, the download screen transitions to the screen depicted in FIG. 6D. The master terminal A notifies the terminals B and C of a URL having the content "77 SAMURAI WARRIORS" designated in FIG. 6B and the corresponding allocated data of the content "77 SAMURAI WARRIORS" is downloaded for each of the terminals B and C.

FIG. 7 is an explanatory diagram of a sequence of the download process. The master terminal A accesses the server 102 and acquires a URL of a file (a file to be downloaded) concerning the content selected as in FIG. 6B (step S701).

The master terminal A notifies the terminals B and C of the acquired URL using the ad-hoc communication (step S702). Thereafter, the master terminal A accesses the server 102 and executes the download process for the allocated data of the master terminal A (step S703).

The terminal B receives the notification of the URL at step S702, accesses the server 102, executes the download process for the allocated data of the terminal B (step S704), and after completing the downloading, transmits to the master terminal A, download completion notification for the allocated data (step S705).

The terminal C receives the notification of the URL at step S702, accesses the server 102, executes the download process for the allocated data of the terminal C (step S706), and after completing the downloading, transmits to the master terminal A, download completion notification for the allocated data (step S707).

FIG. 8 is a sequence diagram depicting details of the download process (steps S703, S704, and S706) for the allocated data. In FIG. 8, a terminal that accesses the server 102 and that downloads the allocated data is referred to as "retrieving terminal". Therefore, the master terminal A and the terminals B and C are also retrieving terminals.

The retrieving terminal transmits a webpage request to the server 102 according to the acquired or notified URL of the server 102 (step S801). The server 102 receives the webpage request and transmits the webpage to the retrieving terminal (step S802). The retrieving terminal selects the file to be downloaded from the webpage (step S803). For example, the master terminal A selects the file to be downloaded (the content "77 SAMURAI WARRIORS") as depicted in FIGS. 6A and 6B. On the other hand, the terminals B and C do not select any file to be downloaded because the master terminal A determines the file to be downloaded.

Thereafter, the retrieving terminal executes a download section calculation process (step S804). Details of the download section calculation process (step S804) will be described later. When a download section is calculated in the download section calculation process (step S804), the retrieving terminal transmits a download request and a download section I(k) to the server 102.

The server 102 receives the download request and the download section I(k) from the retrieving terminal and determines whether the allocated data of the received download section I(k) is present in the file to be downloaded (step S805). If the server 102 determines that the allocated data is present (step S805: YES), the server 102 transmits to the retrieving terminal, the allocated data defined by the download section I(k) (step S806). The retrieving terminal stores to an internal storage apparatus (the memory 302 or the file system), the allocated data transmitted from the server 102 (step S807).

On the other hand, at step S805, if the server 102 determines at step S805 that the allocated data of the received download section I(k) is not present in the file to be downloaded (step S805: NO), the server 102 transmits completion notification to the retrieving terminal (step S808), whereby, the download process of the allocated data comes to an end.

FIG. 9 is a flowchart depicting details of the process procedure of the download section calculation process (step S804). The retrieving terminal sets a download starting position "start(k)" of the download section I(k) to be start (k)=k×S (step S901). The retrieving terminal sets a download ending position "end(k)" of the download section I(k) to be end(k)=start(k)+S−1 (step S902).

The initial value of "k" is the terminal ID of the retrieving terminal. "S" is the seek size. The seek size S is determined in advance. The retrieving terminal transmits the download request and the download section I(k) to the server 102 (step S903). Thereafter, "k" is updated by adding "n (the number of terminals)" to k (step S904) and the procedure returns to step S901.

An operation scheme setting process will be described. The operation scheme refers to a scheme of sharing the data downloaded to each of the terminals. Operation schemes include three types, including a distributed processing scheme, a loose coupling scheme, and a tight coupling scheme. The distributed processing scheme is a scheme for a terminal to issue to the server 102, a download request for data other than the allocated data of the terminal and to download the requested data.

The loose coupling scheme and the tight coupling scheme are both schemes for a terminal to access allocated data downloaded by another terminal using the ad-hoc communication. In particular, the loose coupling scheme is a scheme for a terminal to access a file system of another terminal storing the allocated data that has been downloaded by the other terminal using the ad-hoc communication.

For example, the loose coupling scheme is a scheme for a terminal to access allocated data of another terminal by converting a logical address that designates the allocated data of the other terminal from the terminal into a physical address of the allocated data designated by a file path of a file system of the other terminal (logical to physical conversion).

The tight coupling scheme is a scheme for a terminal to access the memory 302 of another terminal that has downloaded data other than the allocated data (the allocated data of the other terminal). For example, the tight coupling scheme is a scheme for a terminal to access the allocated data of another terminal by converting a logical address that designates the allocated data of another terminal from the terminal into a logical address that designates the allocated data on the memory 302 of the other terminal (logical to logical conversion). In this case, the other terminal converts the converted logical address into a physical address of the allocated data (logical to physical conversion) and thereby, accesses the allocated data.

FIG. 10 is an explanatory diagram of an operation scheme setting sequence. The connection source terminal and the connection destination terminal for the ad hoc communication both wait for a given time period to elapse (step S1001: NO). When the given time period elapses (step S1001: YES), coordinate information indicating the current position of the terminal is updated using the data received via the GPS receiver 306 (step S1002) and the procedure returns to step S1001.

In the above state where the coordinate information indicating the current position of each of the connection source terminal and the connection destination terminal is updated in real time, the connection source terminal transmits a coordinate information acquisition request to the connection destination terminal (step S1003). The connection destination terminal receives the coordinate information acquisition request and transmits to the connection source terminal, the latest coordinate information of the connection destination terminal (step S1004).

The connection source terminal receives the coordinate information of the connection destination terminal and calculates a relative distance between the connection source terminal and the connection destination terminal (step S1005). The connection source terminal executes an operation scheme determination process (step S1006). Details of the operation scheme determination process (step S1006) will be described later. The connection source terminal notifies the connection destination terminal of the determined operation scheme (step S1007).

Thereafter, the connection source terminal executes an operation scheme setting process therefor (step S1008). The connection destination terminal executes the operation scheme setting process therefor (step S1009). Details of the operation scheme setting process (steps S1008 and S1009) will be described later. The coordinate information indicating the current position of each of the connection source terminal and the connection destination terminal is updated in real time. Therefore, the operation scheme is changed dynamically and the optimal operation scheme is determined corresponding to the situation.

FIG. 11 is a flowchart depicting details of the process procedure of the operation scheme determination process (step S1006) depicted in FIG. 10. In the operation scheme determination process (at step S1006), the operation scheme for the connection source terminal and the connection destination terminal is determined based on the relative distance between the terminals and the result of comparison of a communication bandwidth Rt with a storage bandwidth Rs/the memory bandwidth Rm. For the comparison of the communication bandwidth Rt, it is assumed that a specific level of range (±ΔRt in the example) is employed and that each of the storage bandwidth Rs and the memory bandwidth Rm is stored in the memory 302 or the storage 303 in the terminal.

The connection source terminal detects the communication bandwidth Rt for the coordinate information acquisition time period (step S1101). The connection source terminal determines if the relative distance acquired based on the coordinate information of the connection source terminal and that of the connection destination terminal is less than or equal to a predetermined distance (step S1102).

If the connection source terminal determines that the relative distance is not less than or equal to the predetermined distance (step S1102: NO), the connection source terminal determines that the operation scheme to be used between the connection source terminal and the connection destination terminal is the distributed processing scheme (step S1103). The connection source terminal notifies the connection destination terminal of the determined operation scheme (step S1104).

On the other hand, if the connection source terminal determines at step S1102 that the relative distance is less than or equal to the predetermined distance (step S1102:

YES), the connection source terminal compares the communication bandwidth Rt with the storage bandwidth Rs (step S1105). If the result of the comparison of the communication bandwidth Rt with the storage bandwidth Rs is Rt<Rs−ΔRs (step S1105: Rt<Rs−ΔRs), the connection source terminal determines that the operation scheme to be used between the connection source terminal and the connection destination terminal is the distributed processing scheme (step S1103). The connection source terminal notifies the connection destination terminal of the determined operation scheme (step S1104).

On the other hand, if the result of the comparison of the communication bandwidth Rt with the storage bandwidth Rs is Rs−ΔRs≤Rt≤Rs+ΔRs (step S1105: Rs−ΔRs≤Rt≤Rs+ΔRs), the connection source terminal determines that the operation scheme to be used between the connection source terminal and the connection destination terminal is the loose coupling scheme (step S1106). The connection source terminal notifies the connection destination terminal of the determined operation scheme (step S1104).

If the result of the comparison of the communication bandwidth Rt with the storage bandwidth Rs is Rt>Rs+ΔRs (step S1105: Rt>Rs+ΔRs), the connection source terminal compares the communication bandwidth Rt with the memory bandwidth Rm (step S1107). If the result of the comparison of the communication bandwidth Rt with the memory bandwidth Rm is Rt<Rm (step S1107: Rt<Rm), the connection source terminal determines that the operation scheme to be used between the connection source terminal and the connection destination terminal is the loose coupling scheme (step S1106). The connection source terminal notifies the connection destination terminal of the determined operation scheme (step S1104).

On the other hand, when the result of the comparison of the communication bandwidth Rt with the memory bandwidth Rm is Rt≥Rm (step S1107: Rt≥Rm), the connection source terminal determines that the operation scheme to be used between the connection source terminal and the connection destination terminal is the tight coupling scheme (step S1108). The connection source terminal notifies the connection destination terminal of the determined operation scheme (step S1104).

As described, the operation scheme used between the connection source terminal and the connection destination terminal is determined based on the relative distance between the terminals and the size of the communication bandwidth Rt. If the connection source terminal determines at step S1102 that the relative distance is less than or equal to the predetermined distance (step S1102: YES), the connection source terminal may determine that the operation scheme is to be the loose coupling scheme without comparing the communication bandwidth Rt with the storage bandwidth Rs.

If the connection source terminal determines at step S1102 that the relative distance is less than or equal to the predetermined distance (step S1102: YES), the connection source terminal may determine that the operation scheme is to be the tight coupling scheme without comparing the communication bandwidth Rt with the storage bandwidth Rs (step S1105) and without comparing the communication bandwidth Rt with the memory bandwidth Rm (step S1107).

If the comparison result of the communication bandwidth Rt with the storage bandwidth Rs at step S1105 is Rt>Rs+ΔRs (step S1105: Rt>Rs+ΔRs), the connection source terminal may determine that the operation scheme is to be any one among the loose coupling scheme and the tight coupling scheme without comparing the communication bandwidth Rt with the memory bandwidth Rm (step S1107).

FIG. 12 is a flowchart depicting details of the process procedure of the operation scheme setting process (step S1008) executed by the connection source terminal depicted in FIG. 10. The connection source terminal checks the determined operation scheme (step S1201). If the determined operation scheme is the distributed processing scheme (step S1201: DISTRIBUTED), the connection source terminal causes the operation scheme setting process (step S1008) to come to an end.

On the other hand, if the determined operation scheme is the loose coupling scheme (step S1201: LOOSE COUPLING), the connection source terminal acquires from the connection destination terminal, the file path of the allocated data that is downloaded to the connection destination terminal (step S1202). The connection source terminal sets the logical address designating the allocated data that is downloaded to the connection destination terminal, in a logical address space that the application can refer to (step S1203).

The connection source terminal writes the file path acquired at step S1202 into the designated logical address set at step S1203 (step S1204). Thereafter, the connection source terminal makes a logical to logical conversion suspend setting (step S1205). Thereby, the connection source terminal causes the operation scheme setting process (step S1008) to come to an end.

At step S1201, if the determined operation scheme is the tight coupling scheme (step S1201: TIGHT COUPLING), the connection source terminal sets the logical address at the connection source terminal (conversion source logical address) of the allocated data downloaded by the connection destination terminal, in the logical address space (step S1206). The connection source terminal acquires from the connection destination terminal, the logical address at the connection destination terminal (conversion destination logical address) of the allocated data downloaded by the connection destination terminal (step S1207).

The connection source terminal produces a logical to logical conversion table (step S1208). The logical to logical conversion table is a table correlating the conversion source logical address, the conversion destination logical address, and the terminal ID of the connection destination terminal that is the conversion destination. Thereafter, the connection source terminal makes a logical to logical conversion starting up setting (step S1209). The logical to logical conversion starting up setting is a setting that enables access of the logical to logical conversion table.

Thus, the connection source terminal causes the operation scheme setting process (step S1008) to come to an end. As described, in the operation scheme setting process (step S1008) executed by the connection source terminal, mounting with the connection destination terminal can be executed corresponding to the loose or the tight coupling scheme.

Figure 13:
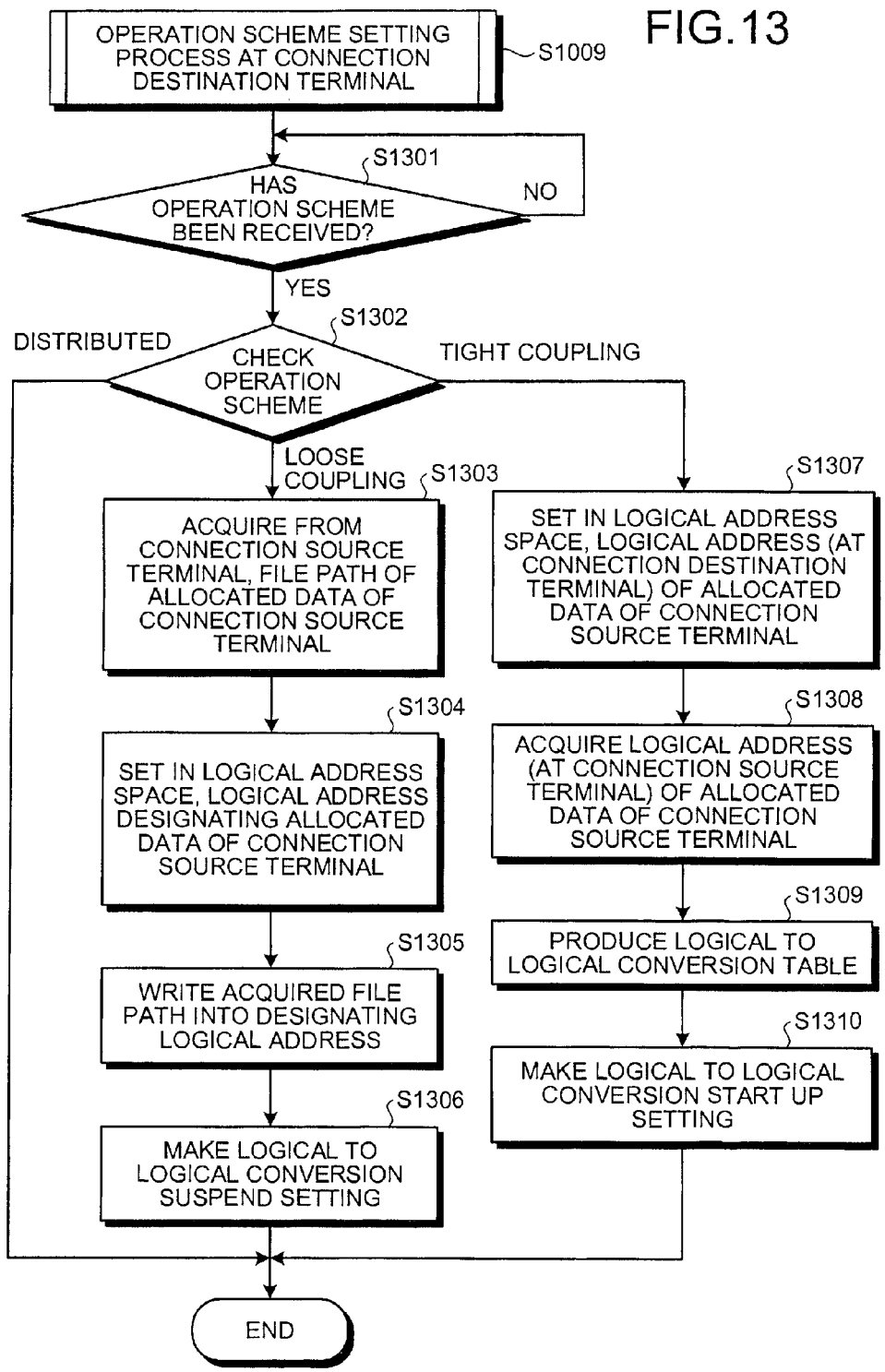
FIG. 13 is a flowchart depicting details of the process procedure of the operation scheme setting process (step S1009) executed by a connection destination terminal depicted in FIG. 10.

FIG. 13 is a flowchart depicting details of the process procedure of the operation scheme setting process (step S1009) executed by the connection destination terminal depicted in FIG. 10. The connection destination terminal waits for the operation scheme from the connection source terminal (step S1301: NO). When the connection destination terminal receives the operation scheme (step S1301: YES), the connection destination terminal checks the received operation scheme (step S1302). If the received operation scheme is the distributed processing scheme (step S1302: DISTRIBUTED), the connection destination terminal causes the operation scheme setting process (step S1009) to come to an end.

On the other hand, if the received operation scheme is the loose coupling scheme (step S1302: LOOSE COUPLING), the connection destination terminal acquires from the connection source terminal, the file path of the allocated data that is downloaded to the connection source terminal (step S1303). The connection destination terminal sets the logical address designating the allocated data that is downloaded to the connection source terminal, in the logical address space that the application can refer to (step S1304).

The connection destination terminal writes the file path acquired at step S1303 into the designating logical address space at step S1304 (step S1305). Thereafter, the connection destination terminal makes a logical to logical conversion suspend setting (step S1306), whereby the connection destination terminal causes the operation scheme setting process (step S1009) to come to an end.

At step S1302, if the determined operation scheme is the tight coupling scheme (step S1302: TIGHT COUPLING), the connection destination terminal sets the logical address at the connection destination terminal (conversion source logical address) of the allocated data downloaded by the connection source terminal, in the logical address space (step S1307). The connection destination terminal acquires from the connection source terminal, the logical address at the connection source terminal (conversion destination logical address) of the allocated data downloaded by the connection source terminal (step S1308).

The connection destination terminal produces a logical to logical conversion table (step S1309). The logical to logical conversion table is a table correlating the conversion source logical address, the conversion destination logical address, and the terminal ID of the connection source terminal that is the conversion destination. Thereafter, the connection destination terminal makes a logical to logical conversion start up setting (step S1310). The logical to logical conversion starting up setting is a setting that enables access of the logical to logical conversion table. Thus, the connection destination terminal causes the operation scheme setting process (step S1009) to come to an end. As described, in the operation scheme setting process (step S1009) executed by the connection destination terminal, mounting with the connection source terminal can be executed corresponding to the loose or the tight coupling scheme.

The execution of the operation scheme setting process (step S1008) by the connection source terminal and that of the operation scheme setting process (step S1009) by the connection destination terminal realize cross-mounting between the connection source terminal and the connection destination terminal.

A specific example of the loose coupling scheme will be described with reference to FIGS. 14 to 17.

FIG. 14 is an explanatory diagram of a state where the terminals A and B respectively download allocated data Da and Db. In FIG. 14, the file path in the file system FSa for the allocated data Da of the terminal A is denoted by "fpa" and the file path in the file system FSb for the allocated data Db of the terminal B is denoted by "fpb".

It is assumed that the allocated data Da of the terminal A is stored at a logical address [0x0150, 0x0249] in a logical address space LSa that is visible from the application of the terminal A; and that the allocated data Db of the terminal B is stored at a logical address [0x0200, 0x0299] in a logical address space LSb that is visible from the application of the terminal B.

Figure 15:
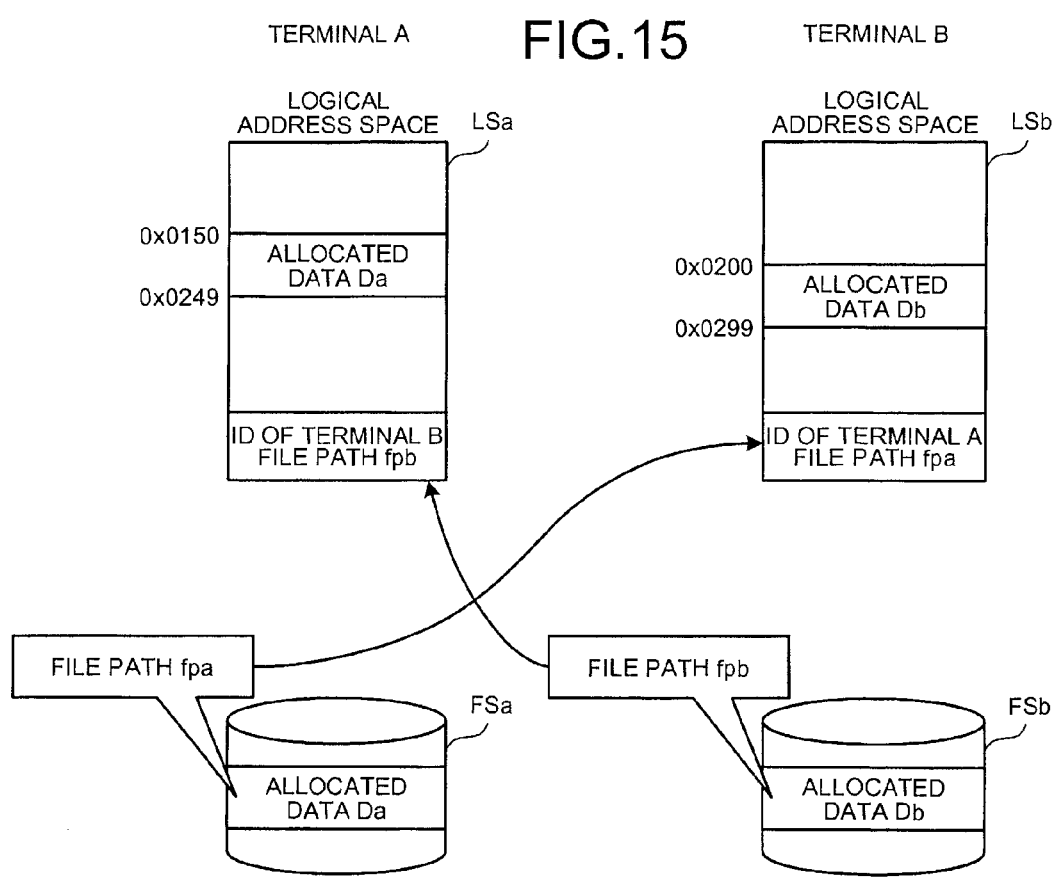
FIG. 15 is an explanatory diagram of a state where loose coupling is established employing terminal A as a connection source terminal and terminal B as a connection destination terminal from the state depicted in FIG. 14.

FIG. 15 is an explanatory diagram of a state where loose coupling is established employing the terminal A as the connection source terminal and the terminal B as the connection destination terminal from the state depicted in FIG. 14. For example, the terminal ID of the terminal B and the file path fpb to the allocated data Db are set in an unused address of the logical address space LSa of the terminal A. Thereby, the file system FSb of the terminal B is mounted on the terminal A. Similarly, the terminal ID of the terminal A and the file path fpa to the allocated data Da are set in an unused address of the logical address space LSb of the terminal B. Thereby, the file system FSa of the terminal A is mounted on the terminal B.

Figure 16:
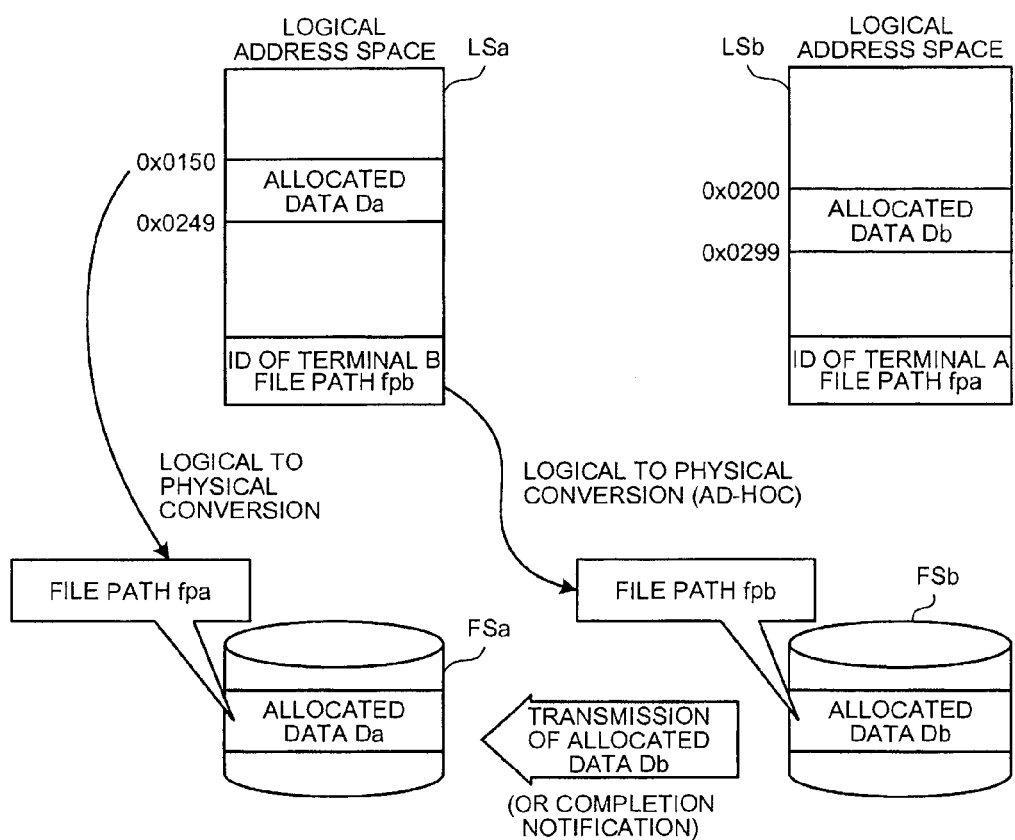
FIG. 16 is an explanatory diagram (Part I) of data access after the loose coupling is set in FIG. 15.

FIG. 16 is an explanatory diagram (Part I) of data access after the loose coupling is set in FIG. 15. FIG. 16 depicts an example where the terminal A accesses the allocated data Da and Db. When the terminal A accesses the allocated data Da, the application of the terminal A designates the logical address of the allocated data Da of the logical address space LSa and thereby, a controller of the storage 303 of the terminal A refers to the file path fpa to the allocated data Da and executes the logical to physical conversion. The terminal A can access the allocated data Da by designating the physical address that is logical-to-physical-converted.

When the terminal A accesses the allocated data Db, the application of the terminal A designates the terminal ID of the terminal B and the logical address having the file path fpb in the logical address space LSa and starts up a communication driver. The terminal A transmits the file path fpb to the terminal B via the communication driver. The terminal B refers to the file path fpb from the terminal A and accesses the allocated data Db in the storage 303 of the terminal B.

For read access, the terminal B transmits the allocated data Db to the terminal A. The terminal A receives the allocated data Db from the terminal B. For write access, the terminal B transmits write completion notification to the terminal A. In this manner, the terminal A can access the allocated data Db.

Figure 17:
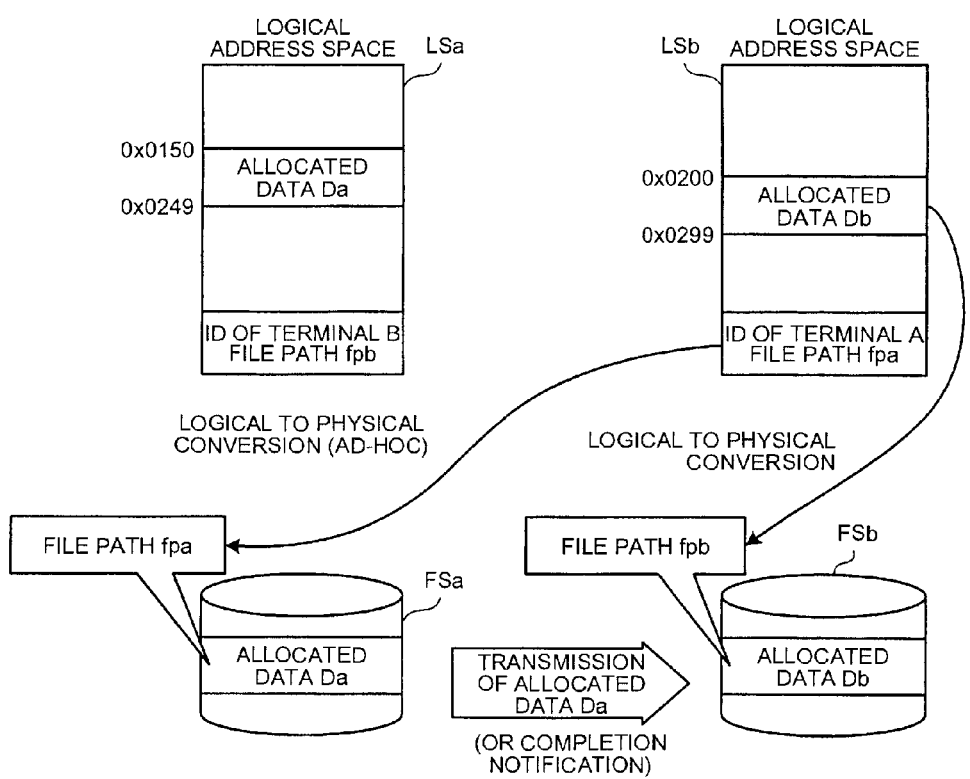
FIG. 17 is an explanatory diagram (Part II) of data access after the loose coupling is set in FIG. 15.

FIG. 17 is an explanatory diagram (Part II) of data access after the loose coupling is set in FIG. 15. FIG. 17 depicts an example where the terminal B accesses the allocated data Da and Db. When the terminal B accesses the allocated data Db, the application of the terminal B designates the logical address of the allocated data Db of the logical address space LSb and thereby, a controller of the storage 303 of the terminal B refers to the file path fpb to the allocated data Db and executes the logical to physical conversion. The terminal B can access the allocated data Db by designating the physical address that is logical-to-physical-converted.

When the terminal B accesses the allocated data Da, the application of the terminal B designates the terminal ID of the terminal A and the logical address having the file path fpa in the logical address space LSb and starts up a communication driver. The terminal B transmits the file path fpa to the terminal A via the communication driver. The terminal A refers to the file path fpa from the terminal B and accesses the allocated data Da in the storage 303 of the terminal A.

For read access, the terminal A transmits the allocated data Da to the terminal B. The terminal B receives the allocated data Da from the terminal A. For write access, the terminal A transmits write completion notification to the terminal B. In this manner, the terminal B can access the allocated data Da.

A specific example of the tight coupling will be described with reference to FIGS. 18 to 21.

Figure 18:
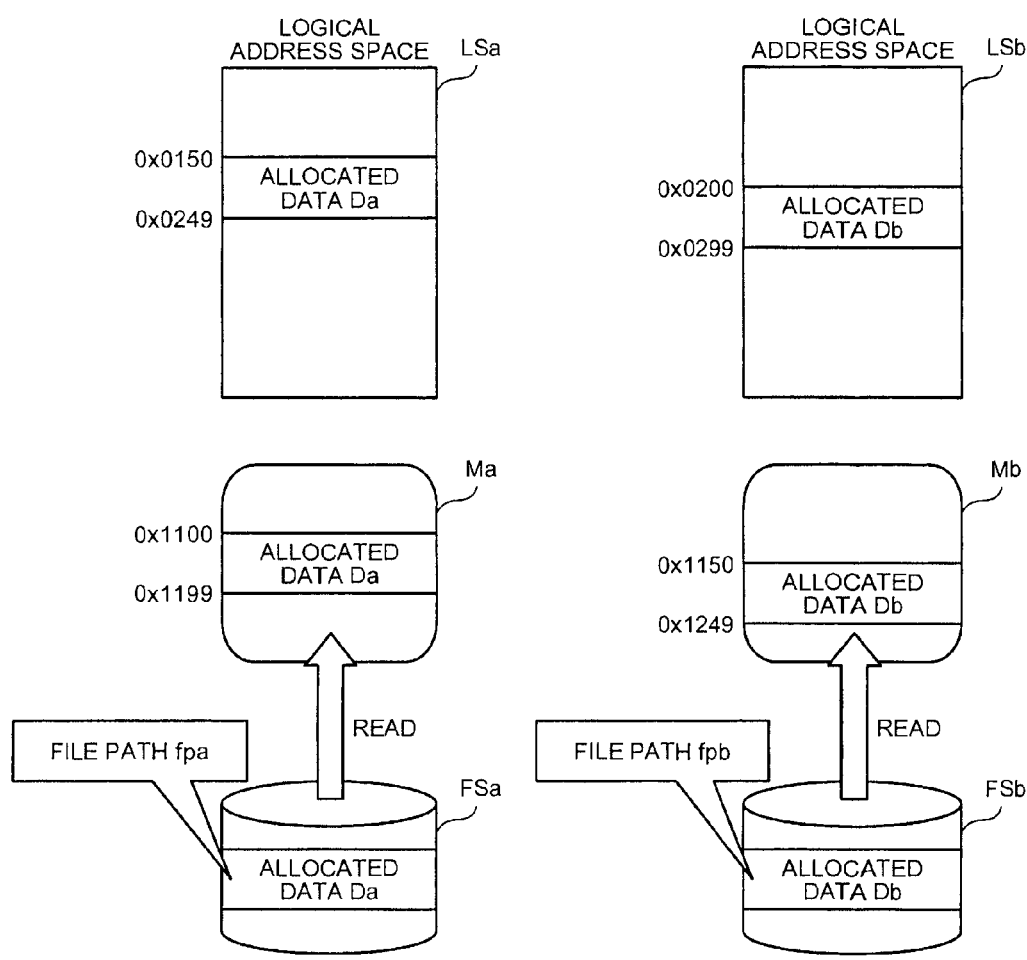
FIG. 18 is an explanatory diagram of a state where terminals A and B respectively download the allocated data Da and Db.

FIG. 18 is an explanatory diagram of a state where the terminals A and B respectively download the allocated data Da and Db. In FIG. 18, a file path in the file system FSa of the allocated data Da of the terminal A is denoted by "fpa"

and a file path in the file system FSb of the allocated data Db of the terminal B is denoted by "fpb".

It is assumed that the allocated data Da of the terminal A is stored at a logical address [0x0150, 0x0249] in the logical address space LSa that is visible from the application of the terminal A and that the allocated data Db of the terminal B is stored at the logical address [0x0200, 0x0299] in the logical address space LSb that is visible from the application of the terminal B.

In the tight coupling scheme, the terminal A reads the allocated data Da from the file system FSa in the storage 303 of the terminal A to the memory 302 of the terminal A (hereinafter, referred to as "memory Ma"). If the allocated data Da has already been read, this step is not necessary. The physical address [0x1100, 0x1199] on the memory Ma of the allocated data Da is correlated with the logical address [0x0150, 0x0249] of the logical address space LSa. Thus, when the logical address [0x0150, 0x0249] is designated, the controller of the memory Ma converts the logical address into the physical address [0x1100, 0x1199] on the memory Ma.

Further in the tight coupling scheme, the terminal B similarly reads the allocated data Db from the file system FSb in the storage 303 of the terminal B to the memory 302 of the terminal B (hereinafter, referred to as "memory Mb"). If the allocated data Db has already been read, this step is not necessary. The physical address [0x1150, 0x1249] on the memory 302 of the allocated data Db is correlated with the logical address [0x0200, 0x0299] of the logical address space LSb. Thus, when the logical address [0x1150, 0x1249] is designated, the controller of the memory Mb converts the logical address into the physical address [0x0200, 0x0299] on the memory Mb.

Figure 19:
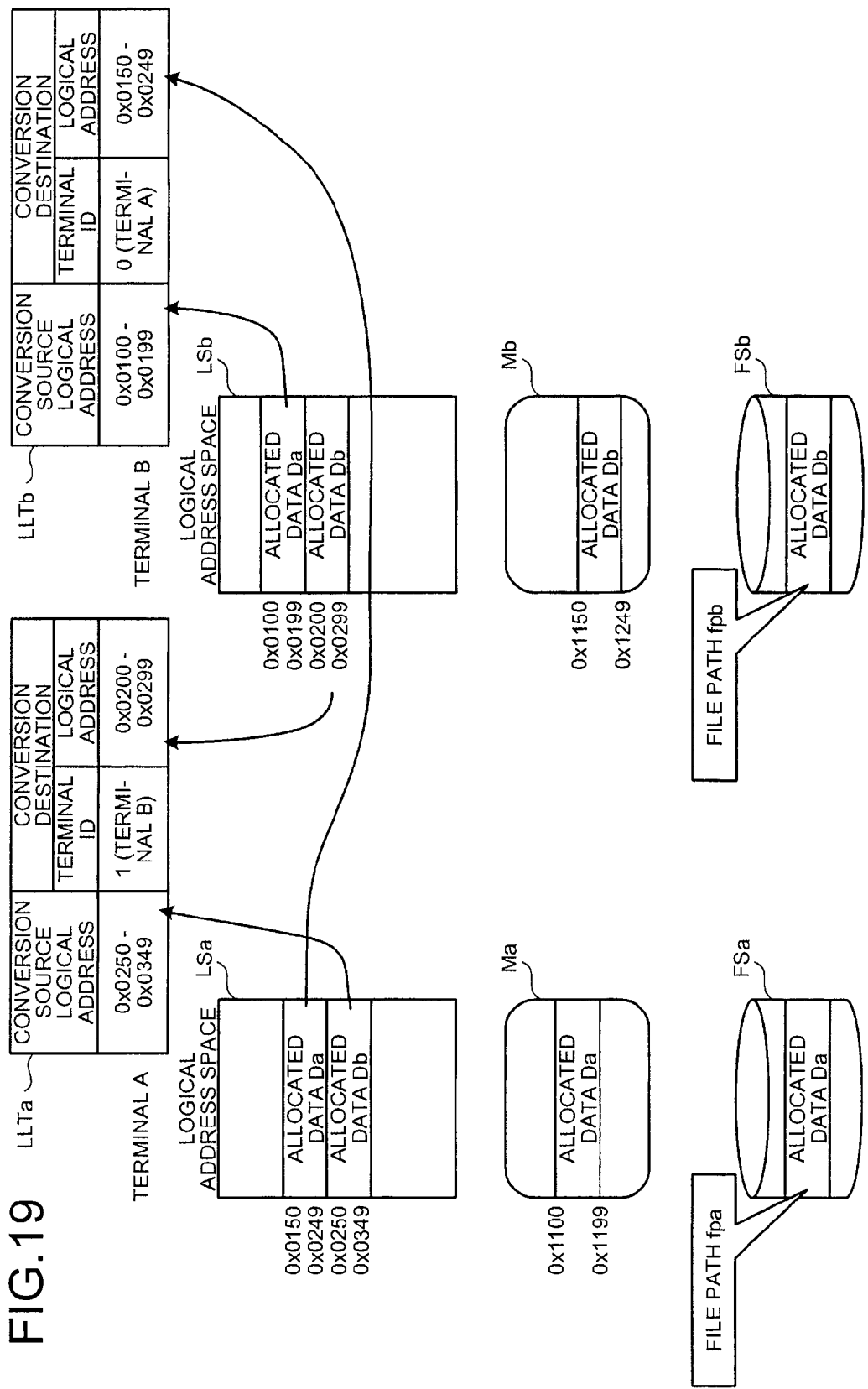
FIG. 19 is an explanatory diagram of a state where tight coupling is established employing terminal A as the connection source terminal and terminal B as the connection destination terminal from the state depicted in FIG. 18.

FIG. 19 is an explanatory diagram of a state where the tight coupling is established employing the terminal A as the connection source terminal and the terminal B as the connection destination terminal from the state depicted in FIG. 18. For example, the terminal A acquires from the terminal B, the logical address (the conversion destination logical address) of the allocated data Db, and allocates the conversion source logical address of the allocated data Db to the logical address space of the terminal A. The terminal A produces a logical to logical conversion table LLTa correlating the conversion source logical address, the conversion destination terminal ID, and the conversion destination logical address. Thereby, the memory Mb of the terminal B is mounted on the terminal A.

Similarly, the terminal B acquires from the terminal A the logical address (the conversion destination logical address) of the allocated data Da, and allocates the conversion source logical address of the allocated data Da to the logical address space of the terminal B. The terminal B produces a logical to logical conversion table LLTb correlating the conversion source logical address, the conversion destination terminal ID, and the conversion destination logical address. Thereby, the memory Ma of the terminal A is mounted on the terminal B.

Figure 20:
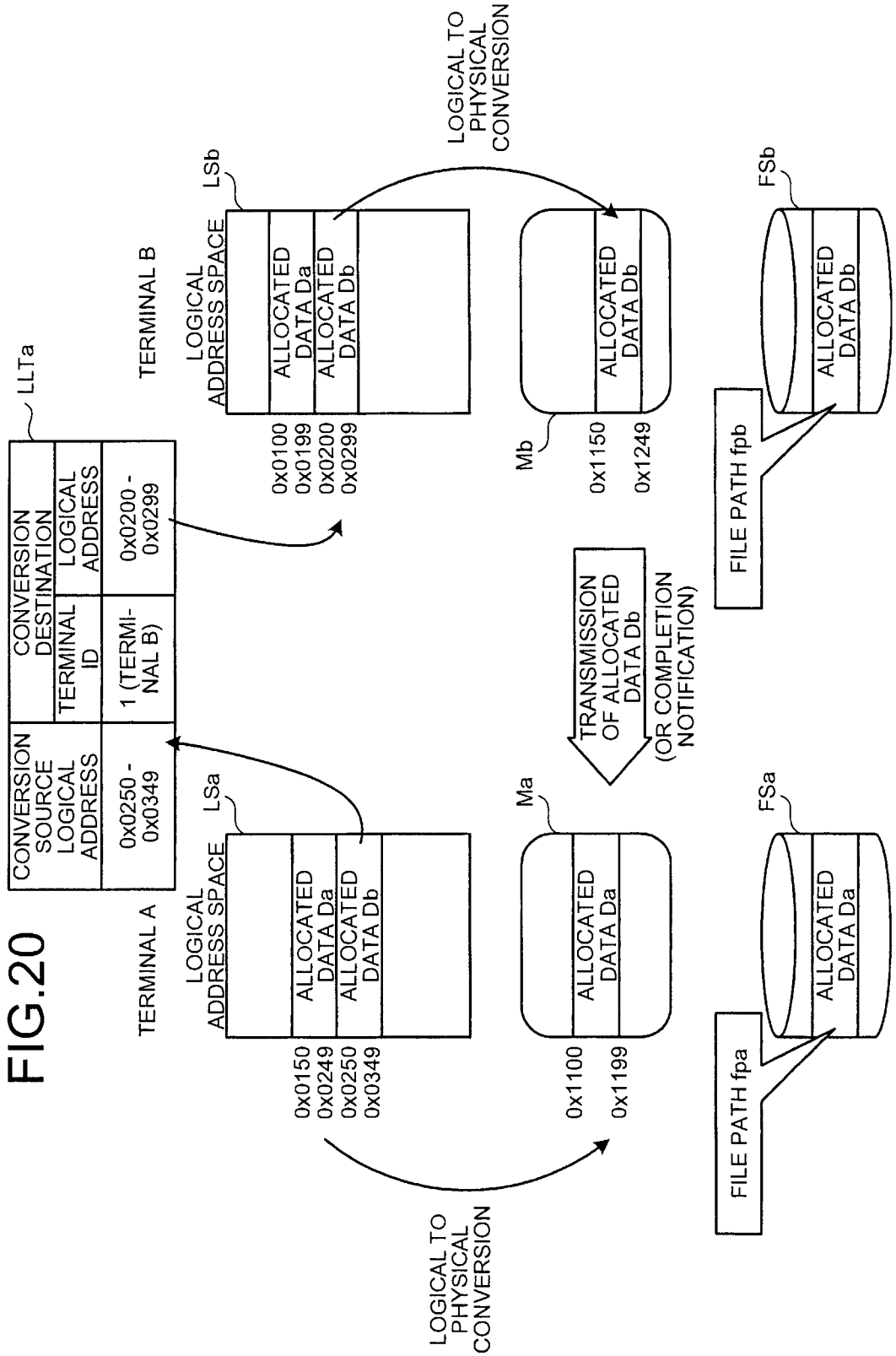
FIG. 20 is an explanatory diagram (Part I) of data access after the tight coupling is set in FIG. 19.

FIG. 20 is an explanatory diagram (Part I) of data access after the tight coupling is set in FIG. 19. FIG. 20 depicts an example where the terminal A accesses the allocated data Da and Db. When the terminal A accesses the allocated data Da, the application of the terminal A designates the logical address of the allocated data Da of the logical address space LSa and thereby, the controller of the memory Ma converts the logical address into the physical address of the allocated data Da. The terminal A can access the allocated data Da on the memory Ma by designating the physical address that is logical-to-physical-converted.

When the terminal A accesses the allocated data Db, the application of the terminal A designates the logical address of the allocated data Db of the logical address space LSa and refers to the logical to logical conversion table LLTa using the designated logical address as the conversion source logical address. In the logical to logical conversion table LLTa, the terminal ID and the conversion destination logical address of the conversion destination are identified.

Therefore, the terminal A starts up the communication driver and transmits the conversion destination logical address to the terminal B, which is the conversion destination. The terminal B refers to the conversion destination logical address from the terminal A and the controller of the memory 302 converts the conversion destination logical address into the physical address of the allocated data Db. The terminal B can access the allocated data Db on the memory Mb by designating the logical-to-physical-converted physical address.

Thereafter, for read access, the terminal B transmits the allocated data Db to the terminal A. The terminal A receives the allocated data Db from the terminal B. For write access, the terminal B transmits writing completion notification to the terminal A. In this manner, the terminal A can access the allocated data Db.

Figure 21:
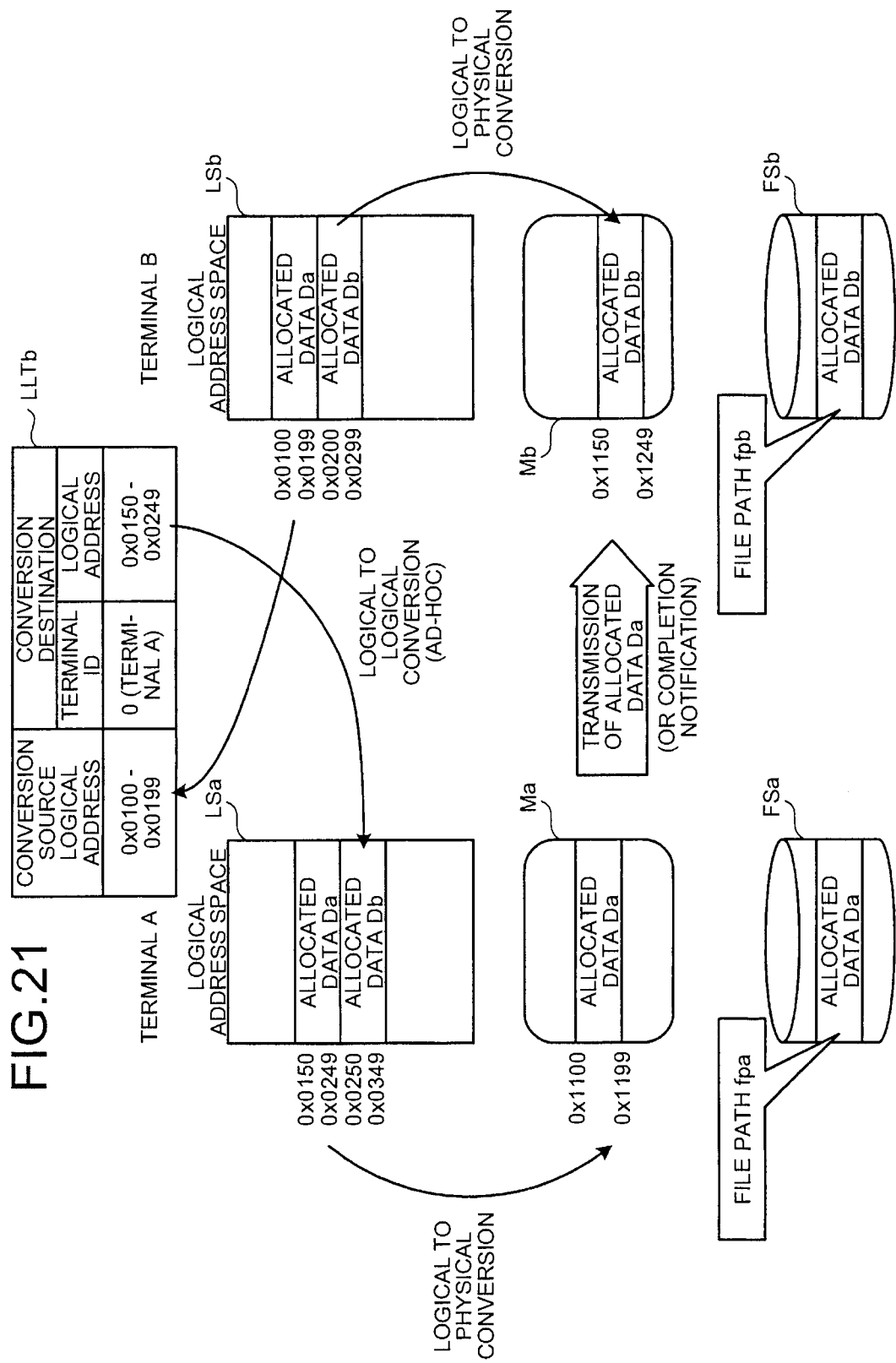
FIG. 21 is an explanatory diagram (Part II) of data access after the tight coupling is set in FIG. 19.

FIG. 21 is an explanatory diagram (Part II) of data access after the tight coupling is set in FIG. 19. FIG. 21 depicts an example where the terminal B accesses the allocated data Da and Db. When the terminal B accesses the allocated data Db, the application of the terminal B designates the logical address of the allocated data Db of the logical address space LSb and thereby, the controller of the memory Mb converts the logical address into the physical address of the allocated data Db. The terminal B can access the allocated data Db on the memory Mb by designating the logical-to-physical-converted physical address.

When the terminal B accesses the allocated data Da, the application of the terminal B designates the logical address of the allocated data Da of the logical address space LSb and refers to the logical to logical to logical conversion table LLTb using the designated logical address as the conversion source logical address. In the logical to logical conversion table LLTb, the terminal ID and the conversion destination logical address of the conversion destination are identified.

Therefore, the terminal B starts up the communication driver and transmits the conversion destination logical address to the terminal A, which is the conversion destination. The terminal A refers to the conversion destination logical address from the terminal B and the controller of the memory Ma converts the conversion destination logical address into the physical address of the allocated data Da. The terminal A can access the allocated data Da on the memory Ma by designating the logical-to-physical-converted physical address.

Thereafter, for read access, the terminal A transmits the allocated data Da to the terminal B. The terminal B receives the allocated data Da from the terminal A. For write access, the terminal A transmits writing completion notification to the terminal B. In this manner, the terminal B can access the allocated data Da.

FIG. 22 is an explanatory diagram of the sequence of the data access process executed between the terminals. An access source terminal that is to access data waits for a data access (read or write) request to be issued (step S2201: NO). When the access source terminal determines that the data access request has been issued (step S2201: YES), the access source terminal determines whether the logical to logical conversion has been invoked (step S2202). If the access source terminal determines that the logical to logical conversion has been invoked (step S2202: YES), the access source terminal refers to the logical to logical conversion table and executes the logical to logical conversion (step S2203).

On the other hand, if the access source terminal determines that the logical to logical conversion has not been invoked (step S2202: NO), the access source terminal causes the sequence to progress to step S2204. At step S2204, the access source terminal determines whether the terminal to be accessed is the access source terminal (the access source terminal itself) (step S2204). For example, in the loose coupling scheme, when the terminal ID and the file path are designated, the terminal designated by the terminal ID is the access destination terminal that is to be accessed. In the tight coupling scheme, the terminal designated by the terminal ID when the access source terminal refers to the logical to logical conversion table is the access destination terminal.

If the access source terminal determines that the terminal to be accessed is the access source terminal (step S2204: YES), the access source terminal converts the logical address designated by the access request into the physical address (step S2205) and accesses the converted physical address in the access source terminal (step S2206), whereby the data access comes to an end.

On the other hand, if the access source terminal determines at step S2204 that the terminal to be accessed is another terminal (step S2204: NO), the access source terminal starts up the communication driver (step S2207) and executes the data access process between the terminals (step S2208), whereby access of data at the access destination terminal is enabled using the ad-hoc communication.

FIG. 23 is a sequence diagram (Part I) depicting details of the process procedure of the data access process executed between the terminals (step S2208) depicted in FIG. 22. FIG. 23 depicts a case where the data access is read access. The access source terminal first transmits a read request to the access destination terminal using the ad-hoc communication (step S2301). The access destination terminal receives the read request and analyzes the read request (step S2302). For example, the access destination terminal extracts information included in the read request. The access destination terminal extracts the file path in the loose coupling scheme or the conversion destination logical address in the tight coupling scheme.

The access destination terminal, based on the information acquired in the analysis, identifies the physical address that is to be read (step S2303). For example, when the file path is extracted, the access destination terminal refers to the file path and identifies the physical address. When the conversion destination logical address is extracted, the conversion destination logical address is logical-to-physical-converted to identify the physical address.

Thereafter, the access destination terminal accesses the identified physical address, reads the data to be downloaded (step S2304), and transmits the read data to the access source terminal, which is the transmission source of the read request (step S2305). The access source terminal receives the data to be downloaded that is transmitted from the access destination terminal (step S2306), whereby the data access process executed between the terminals for the read access (step S2208) comes to an end.

FIG. 24 is a sequence diagram (Part II) depicting details of the procedure of the data access process executed between the terminals (step S2208) depicted in FIG. 22.

FIG. 24 depicts a case where the data access is write access. The access source terminal first transmits to the access destination terminal using the ad-hoc communication, a write request and the data to be written (step S2401). The access destination terminal receives the write request and analyzes the write request (step S2402). For example, the access destination terminal extracts information included in the write request. The access destination terminal extracts the file path and the data to be written, in the loose coupling scheme or the conversion destination logical address and the data to be written, in the tight coupling scheme.

The access destination terminal, based on the information acquired in the analysis, identifies the physical address to which the data is to be written (step S2403). For example, when the file path is extracted, the access destination terminal refers to the file path and identifies the physical address. When the conversion destination logical address is extracted, the conversion destination logical address is logical-to-physical-converted to identify the physical address.

Thereafter, the access destination terminal accesses the identified physical address, writes the data (step S2404), and transmits write completion notification to the access source terminal, which is the transmission source of the write request (step S2405). Thus, the data access process executed between the terminals for the write access (step S2208) comes to an end. In this manner, data access between terminals is enabled by cross-mounting between the terminals.

FIG. 25 is a sequence diagram depicting details of the process procedure of the allocated data download process (steps S703, S704, and S706). Although the process has been described with reference to FIG. 8 for the retrieving terminal as the main entity to download the allocated data, the process will be described herein with reference to FIG. 25 for the server 102 as the main entity to download the allocated data. Process steps identical to those depicted in FIG. 8 are given the same step numbers used in FIG. 8 and will not again be described.

After selecting the file to be downloaded at step S803, the retrieving terminal transmits to the server 102, a download request, the terminal ID (=k), and the total number of terminals n (step S2504). The server 102 executes the download section calculation process (step S2505). The download section calculation process (step S2505) will be described later. Thereafter, the server 102 transmits to the retrieving terminal, the allocated data that is designated by the download section (step S2506).

The retrieving terminal stores the received allocated data to the memory 302 or the storage 303 (step S2507). Thereafter, when the server 102 downloads all the allocated data, the server 102 transmits completion notification to the retrieving terminal (step S2508), whereby the allocated data download process comes to an end.

FIG. 26 is a flowchart depicting details of the process procedure of the download section calculation process (step S2505) depicted in FIG. 25. The server 102 sets the download starting position "start(k)" of the download section I(k) to be start(k)=k×S (step S2601), and also sets the download ending position "end(k)" of the download section I(k) to be end(k)=start(k)+S−1 (step S2602).

The server 102 determines whether the allocated data designated by the received download section I(k) is present in the file to be downloaded (step S2603). If the server 102 determines that the allocated data is present in the file to be downloaded (step S2603: YES), the server 102 transmits to the retrieving terminal, the allocated data designated by the download section I(k) (step 2604).

The retrieving terminal stores to an internal storage apparatus (the memory 302 or the storage 303), the allocated data transmitted from the server 102 (step S2507). Thereafter, the server 102 updates "k" by adding "n" to "k" (step S2605) and the procedure returns to step S2601. Thus, the download starting position and the download ending position are updated.

On the other hand, if the server 102 determines at step S2603 that the allocated data designated by the received download section I(k) is not present in the file to be downloaded (step S2603: NO), the server 102 transmits completion notification to the retrieving terminal (step S2606), whereby the allocated data download process comes to an end.

FIG. 27 is a sequence diagram depicting details of the process procedure of the allocated data download process (steps S703, S704, and S706). Although the process has been described with reference to FIG. 8 for the retrieving terminal as the main entity to download the allocated data, the process will be described herein with reference to FIG. 27 for the retrieving terminal as the main entity to download the allocated data taking into consideration differences in performance. Process steps identical to those depicted in FIG. 8 are given the same step numbers used in FIG. 8 and will not again be described. The retrieving terminals other than the master terminal will each be referred to as "slave terminal".

After selecting the file to be downloaded at step S803, the master terminal executes the download section calculation process (step S2704). The details of the download section calculation process (step S2704) will be described later.

In the download section calculation process (step S2704), the master terminal transmits a download request and the download section I(j) of the master terminal to the server 102 (step S2705). Further in the download section calculation process (step S2704), the master terminal transmits the download section I(j) of the slave terminal to the slave terminal (step S2706).

Thereafter, the slave terminal transmits a download request and the download section I(j) of the slave terminal to the server 102 (step S2707). The server 102 receives the download request and the download section I(j) and determines whether the allocated data of the received download section I(j) is present in the file to be downloaded (step S2708). If the server 102 determines that the allocated data is present in the file to be downloaded (step S2708: YES), the server 102 transmits the allocated data defined by the download section I(j) to the transmission source terminal of the download section I(j) (the master terminal or the slave terminal) (step S2709).

The master terminal stores to an internal storage apparatus (the memory 302 or the file system), the allocated data transmitted from the server 102 (step S2710). The slave terminal stores to an internal storage apparatus (the memory 302 or the storage 303), the allocated data transmitted from the server 102 (step S2711).

On the other hand, if the server 102 determines that the allocated data of the received download section I(j) is not present in the file to be downloaded (step S2708: NO), the server 102 transmits completion notification to the transmission source terminal of the download section I(j) (the master terminal or the slave terminal) (step S2712).

FIG. 28 is a flowchart depicting details of the process procedure of the download section calculation process (step S2704) depicted in FIG. 27. The master terminal sets "k" that is the terminal ID to be k=0 and the seek size S(k) of the terminal whose terminal ID is ID=k (where, k is K=0 for the master terminal A and k is K=1 or 2 for the slave terminal B or C) to be $S(k)=S \times \{b(k)/\Sigma b(k)\}$ (step S2801).

In this example, S is a fixed seek size; b(k) is a communication line speed of the terminal whose terminal ID is ID=k; and $\Sigma p(k)$ is the total of the communication line speeds of all the terminals (the terminals A to C) that share the data. The seek size S(k) is the seek size acquired taking into consideration differences in performance among the terminals. The communication line speed b(k) of the slave terminal is periodically acquired.

The master terminal sets a variable j to be j=k (step S2802) and determines whether j is j=0 (step S2803). If the master terminal determines that j is j=0 (step S2803: YES), the master terminal A sets the download starting position "start(j)" of the download section I(j) of the file to be downloaded to be start(j)=0 (step S2804) and proceeds to step S2806. On the other hand, if the master terminal determines that j is not j=0 (step S2803: NO), the master terminal A sets the download starting position start(j) of the file to be downloaded to be start(j)=end(j−1)+1 (step S2804) and proceeds to step S2806.

At step S2806, the master terminal sets the download ending position "end(j)" of the download section I(j) to be end(j)=start(j)+S(k)−1 (step S2806). The master terminal A determines whether k, which is the terminal ID, is k=0 (step S2807). If the master terminal A determines that k is k=0 (step S2807: YES), the master terminal A transmits the download request and the download section I(j) from the mater terminal A (k=0), to the server 102 (step S2808) and proceeds to step S2810.

On the other hand, if the master terminal A determines that k is not k=0 (step S2807: NO), the master terminal transmits to the slave terminal whose terminal ID is ID=k (k≠0), the download section I(j) thereof (step S2809) and the procedure progresses to step S2810.

At step S2810, the master terminal increments the variable j (step S2810) and also increments k, which is the terminal ID (step S2811). The master terminal A determines whether k is k=n (step S2812). "n" is the total number of terminals. If the master terminal A determines that k is not k=n (step S2812: NO), the master terminal A returns to step S2803. On the other hand, if the master terminal A determines that k is k=n (step S2812: YES), the master terminal A sets k to be k=0 (step S2813) and returns to step S2803.

Thus, the section width of the download section I(k) varies according to the performance of the retrieving terminal, that is, the seek size S(k) and therefore, a retrieving terminal having higher performance downloads a file of a larger file size.

FIG. 29 is a sequence diagram depicting details of the process procedure of the download process (steps S703, S704, and S706) of the allocated data. Although the process has been described with reference to FIG. 27 for the retrieving terminal as the main entity to download the allocated data taking into consideration the difference in the performance, a process will be described herein with reference to FIG. 29 for the server 102 as the main entity to download the allocated data taking into consideration differences in performance. Process steps identical to those depicted in FIG. 8 are given the same step numbers used in FIG. 8 and will not again be described.

After selecting the file to be downloaded at step S803, the retrieving terminal transmits a download request, the terminal ID (=k), and the line speed b(k) to the server 102 (step S2904). The server 102 receives the download request from the retrieving terminal and executes the download section calculation process (step S2905). Details of the download section calculation process (step S2905) will be described later.

The server 102 calculates the download section I(k) and transmits to the retrieving terminal, the allocated data designated by the download section I(k) of the file to be downloaded (step S2906). The retrieving terminal receives the allocated data and stores the allocated data to a storage apparatus (the memory 302 or the file system) (step S2907). If no allocated data is present that is designated by the download section I(k) in the download section calculation process (step S2905), the server 102 transmits completion notification to the retrieving terminal (step S2908).

FIG. 30 is a flowchart depicting details of the process procedure of the download section calculation process (step S2905) depicted in FIG. 29. The server 102 sets "k", which is the terminal ID, to be k=0 and the seek size S(k) of the retrieving terminal whose terminal ID is ID=k to be S(k) =S×{b(k)/Σb(k)} (step S3001).

In this example, S is a fixed seek size; b(k) is the communication line speed of the retrieving terminal whose terminal ID is ID=k; and Σb(k) is the total of the communication line speeds of all the terminals (the retrieving terminals A to C) that share the data. The seek size S(k) is a seek size acquired taking into consideration differences in performance among the terminals. The download section calculation process (step S2905) can only be executed when the communication line speeds b(k) of all the retrieving terminals are present and therefore, when a download request is issued from a retrieving terminal, the communication line speeds of the rest of the retrieving terminals may be acquired. The communication line speeds of all the retrieving terminals may periodically be acquired and the most recently acquired communication line speeds may be used.

The server 102 sets the variable j to be j=k (step S3002) and determines whether j is j=0 (step S3003). If the server 102 determines that j is j=0 (step S3003: YES), the server 102 sets the download starting position start(j) of the download section I(j) of the file to be downloaded to be start(j)=0 (step S3004) and proceeds to step S3006. On the other hand, if the server 102 determines that j is not j=0 (step S3003: NO), the server 102 sets the download starting position start(j) of the file to be downloaded to be start(j)=end(j−1)+1 (step S3005) and proceeds to step S3006.

At step S3006, the server 102 sets the download ending position end(j) of the download section I(j) to be end(j)=start (j)+S(k)−1 (step S3006). The server 102 determines whether the allocated data designated by the download section I(j) is present (step S3007).

If the server 102 determines that the allocated data designated by the download section I(j) is present (step S3007: YES), the server 102 transmits the allocated data designated by the download section I(j) to the retrieving terminal whose terminal ID is ID=k (step S3008). Thereafter, the server 102 increments the variable j (step S3009) and also increments k, which is the terminal ID (step S3010).

The server 102 determines whether k is k=n (step S3011). "n" is the total number of terminals. If the server 102 determines that k is not k=n (step S3011: NO), the server 102 returns to step S3003. On the other hand, if the server 102 determines that k is k=n (step S3011: YES), the server 102 sets k to be k=0 (step S3012) and the procedure returns to step S3003.

If the server 102 determines at step S3007 that the allocated data designated by the download section I(j) is not present (step S3007: NO), the server 102 transmits completion notification to all retrieving terminals (step S3013), whereby the download section calculation process (step S2905) comes to an end.

Thus, the section width of the download section I(k) varies according to the performance of the retrieving terminal, that is, the seek size S(k) and therefore, a retrieving terminal having higher performance downloads a file of a larger file size.

As described, according to the embodiment, efficient data sharing can be realized among the plural terminals. The operation scheme can be switched dynamically corresponding to the size of the bandwidth for the communication with the connection destination terminal and the relative distance thereto. Therefore, efficient data sharing can be realized among the terminals. In addition, downloading from the server 102 can be executed taking into consideration differences in performance among the terminals and therefore, the load on the terminals caused by the downloading can be distributed corresponding to the performance of each of the terminals.

When the executing main entity in the above flowcharts is the server 102, the process steps in the above flowchart are realized, for example, by causing the CPU 201 to execute programs stored in a storage apparatus such as the ROM 202, the RAM 203, or the magnetic disk 205 depicted in FIG. 2. When the executing main entity in the above flowchart is the terminal, the process steps in the flowcharts are realized, for example, by causing the processor 301 to execute programs stored in a storage apparatus such as the memory 302 or the storage 303 depicted in FIG. 3.

According to the data sharing program, the terminal, and the data sharing method, an effect is achieved in that efficient data sharing can be realized among the plural terminals. According to the data sharing program, the data distribution program, the terminal, the server, the data sharing method, and the data distribution method, an effect is achieved in that the data allocated to each of the terminals can efficiently be downloaded because data sharing among the plural terminals is realized.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable medium storing a data sharing program configured to cause a processor of a first terminal to execute a process comprising:

detecting a communication bandwidth used between the first terminal and a second terminal that are communicably connected in an ad-hoc network;

comparing the detected communication bandwidth and a bandwidth related to a storage apparatus of the first terminal;

determining an operation scheme for sharing of data in the storage apparatus of the first terminal and data in a storage apparatus of the second terminal, based on a comparison result obtained at the comparing;

notifying the second terminal of the determined operation scheme; and executing a mounting process that enables access of the storage apparatus of the first terminal by the second terminal, based on the determined operation scheme, wherein:

the comparing includes comparing the communication bandwidth and a bandwidth related to a main storage apparatus of the first terminal, the determining includes determining the operation scheme related to the sharing of data to be a tight coupling scheme configured to enable the first terminal to access allocated data downloaded by the second terminal using the ad-hoc communication, by converting a logical address that designates the allocated data of the second terminal from the first terminal into a logical address that designates the allocated data on a main storage apparatus of the second terminal, when the communication bandwidth is equal to or greater than the bandwidth related to the main storage apparatus, and the executing includes executing a mounting process configured to enable access of the main storage apparatus of the first terminal by the second terminal, when the operation scheme is determined to be the tight coupling scheme.

2. The non-transitory computer-readable medium according to claim 1, wherein:

the determining includes determining the operation scheme related to the sharing of data to be a loose coupling scheme configured to enable access of an auxiliary storage apparatus of the first terminal by the second terminal and according to which the first terminal accesses an auxiliary storage apparatus of the second terminal, when the detected communication bandwidth is less than the bandwidth related to the main storage apparatus, and the executing includes executing a mounting process configured to enable access of the auxiliary storage apparatus of the first terminal by the second terminal, when the operation scheme is determined to be the loose coupling scheme.

3. The non-transitory computer-readable medium according to claim 1, wherein the comparing includes comparing the detected communication bandwidth and the bandwidth related to the main storage apparatus of the first terminal, when the detected communication bandwidth and a bandwidth related to an auxiliary storage apparatus among the storage apparatuses of the first terminal are compared and a bandwidth difference between the detected communication bandwidth and the bandwidth related to the auxiliary storage apparatus is outside a permissible range and the detected communication bandwidth is greater than the bandwidth related to the auxiliary storage apparatus.

4. The non-transitory computer-readable medium according to claim 1, wherein the process further comprises:

acquiring a distance between the first terminal and the second terminal; and determining whether the acquired distance is less than or equal to a predetermined distance, wherein the comparing includes comparing the detected communication bandwidth and the bandwidth related to the main storage apparatus of the first terminal, when the distance is determined to be less than or equal to the predetermined distance.

5. The non-transitory computer-readable medium according to claim 1, wherein:

the comparing further includes comparing the detected communication bandwidth and a bandwidth related to an auxiliary storage apparatus of the first terminal, the determining further includes determining the operation scheme related to the sharing of data to be a loose coupling scheme configured to enable access of the auxiliary storage apparatus of the first terminal by the second terminal and according to which the first terminal accesses an auxiliary storage apparatus of the second terminal, when a bandwidth difference between the detected communication bandwidth and the bandwidth related to the auxiliary storage apparatus of the first terminal is within a permissible range, and the executing further includes executing a mounting process configured to enable access of the auxiliary storage apparatus of the first terminal by the second terminal, when the operation scheme is determined to be a loose coupling scheme.

6. The non-transitory computer-readable medium according to claim 5, wherein:

the determining further includes determining the operation scheme related to the sharing of data to be a tight coupling scheme configured to enable access of the main storage apparatus of the first terminal by the second terminal and according to which the first terminal accesses a main storage apparatus of the second terminal, when the bandwidth difference between the detected communication bandwidth and the bandwidth related to the auxiliary storage apparatus is outside the permissible range and the communication bandwidth is greater than the bandwidth related to the auxiliary storage apparatus, and the executing further includes executing a mounting process configured to enable access of the main storage apparatus and the auxiliary storage apparatus of the first terminal by the second terminal, when the operation scheme is determined to be the tight coupling scheme.

7. The non-transitory computer-readable medium according to claim 5, wherein:

the determining further includes determining the operation scheme related to the sharing of data to be a distributed processing scheme according to which the first and the second terminals access an acquisition source server having data that is in storage apparatuses of the first and the second terminals, when the bandwidth difference between the detected communication bandwidth and the bandwidth related to the auxiliary storage apparatus of the first terminal is outside the permissible range and the detected communication bandwidth is smaller than the bandwidth related to the auxiliary storage apparatus, and the executing further includes accessing the acquisition source server and invoking a program configured to enable a download of data identical to the data stored in a storage apparatus of the second terminal.

8. The non-transitory computer-readable medium according to claim 5, wherein the process further comprises:

acquiring a distance between the first terminal and the second terminal; and determining whether the acquired distance is less than or equal to a predetermined distance, and wherein the comparing includes comparing the detected communication bandwidth and the bandwidth related to the auxiliary storage apparatus of the first terminal, when the distance is judged to be less than or equal to the predetermined distance.

9. The non-transitory computer-readable medium according to claim 1, wherein the process further comprises:
acquiring a distance between the first terminal and the second terminal; and
determining whether the acquired distance is less than or equal to a predetermined distance,
wherein the determining includes determining, without executing the comparing or irrespective of a comparison result, the operation scheme related to the sharing of data to be a distributed processing scheme according to which the first and the second terminals access an acquisition source server having data that is stored in storage apparatuses of the first and the second terminals, when the distance is determined to not be less than or equal to the predetermined distance, and
wherein the executing includes accessing the acquisition source server and invoking a program enabling download of data identical to the data in a storage apparatus of the second terminal.

10. A non-transitory computer-readable medium storing a data sharing program configured to cause a processor of a second terminal to execute a process comprising:
receiving from a first terminal communicably connected to the second terminal in an ad-hoc network, an operation scheme for sharing of data in a storage apparatus of the first terminal and data in a storage apparatus of the second terminal, the operation scheme being determined at the first terminal; and
executing a mounting process configured to enable access of the storage apparatus of the second terminal by the first terminal, based on the received operation scheme,
wherein the executing includes executing a mounting process configured to enable access of a main storage apparatus of the second terminal by the first terminal, when a tight coupling scheme is received, the tight coupling scheme being configured to enable the first terminal to access allocated data downloaded by the second terminal using an ad-hoc communication, by converting a logical address that designates allocated data of the second terminal from the first terminal into a logical address that designates the allocated data on a main storage apparatus of the second terminal.

11. The non-transitory computer-readable medium according to claim 10, wherein the executing includes executing a mounting process that enables access of an auxiliary storage apparatus of the second terminal by the first terminal, when a loose coupling scheme is received, the loose coupling scheme being configured to enable access of an auxiliary storage apparatus of the first terminal by the second terminal and according to which the first terminal accesses the auxiliary storage apparatus of the second terminal.

12. The non-transitory computer-readable medium according to claim 10, wherein the executing includes, when a distributed processing scheme is received according to which the first and the second terminals access an acquisition source server having data that is stored in the storage apparatuses of the first and the second terminals, accessing the acquisition source server and invoking a program configured to enable a download of data identical to the data stored in a storage apparatus of the first terminal.

13. The non-transitory computer-readable medium according to claim 1, wherein the process further comprises:
acquiring first information concerning a communication speed between the first terminal and a server capable of accessing content and acquiring from the second terminal by ad-hoc communication, second information concerning a communication speed between the second terminal and the server;
identifying, based on the first and the second information, in a download section from a starting position to an ending position for downloading the content, a first section of a data amount corresponding to the first information concerning the communication speed of download to the first terminal and a second section of a data amount corresponding to the second information concerning the communication speed of download to the second terminal;
transmitting the identified second section to the second terminal by the ad-hoc communication and transmitting a download request including the first section to the server;
receiving, responsive to transmitting the download request to the server, data in the first section of the content from the server; and
storing, in the storage apparatus of the first terminal, the received data in the first section, wherein the determining includes determining an operation scheme related to the sharing of the data in the first section stored in the storage apparatus of the first terminal and the data in the second section stored in the storage apparatus of the second terminal, based on the comparison result obtained at the comparing.

14. A first terminal comprising:
a memory; and
a processor coupled to the memory and configured to:
detect a communication bandwidth used between the first terminal and a second terminal that are communicably connected in an ad-hoc network;
compare the detected communication bandwidth and a bandwidth related to a storage apparatus of the first terminal;
determine an operation scheme for sharing of data in the storage apparatus of the first terminal and data in a storage apparatus of the second terminal, based on a comparison result;
notify the second terminal of the determined operation scheme; and
execute a mounting process configured to enable access of the storage apparatus of the first terminal by the second terminal, based on the determined operation scheme,
wherein the processor is further configured to:
compare the communication bandwidth and a bandwidth related to a main storage apparatus of the first terminal,
determine the operation scheme related to the sharing of data to be a tight coupling scheme configured to enable the first terminal to access allocated data downloaded by the second terminal using an ad-hoc communication, by converting a logical address that designates the allocated data of the second terminal from the first terminal into a logical address that designates the allocated data on a main storage apparatus of the second terminal, when the communication bandwidth is equal to or greater than the bandwidth related to the main storage apparatus, and
execute a mounting process configured to enable access of the main storage apparatus of the first terminal by the second terminal, when the operation scheme is determined to be the tight coupling scheme.

15. A second terminal comprising:
a memory; and
a processor coupled to the memory and configured to:

receive from a first terminal communicably connected to the second terminal in an ad-hoc network, an operation scheme for sharing of data in a storage apparatus of the first terminal and data in a storage apparatus of the second terminal, the operation scheme being determined at the first terminal; and execute a mounting process configured to enable access of the storage apparatus of the second terminal by the first terminal, based on the received operation scheme, wherein the processor is further configured to execute a mounting process configured to enable access of a main storage apparatus of the second terminal by the first terminal, when a tight coupling scheme is received, the tight coupling scheme being configured to enable the first terminal to access allocated data downloaded by the second terminal using an ad-hoc communication, by converting a logical address that designates allocated data of the second terminal from the first terminal into a logical address that designates the allocated data on a main storage apparatus of the second terminal.

16. A data sharing method to be executed by a first terminal, the data sharing method comprising:

detecting a communication bandwidth used between the first terminal and a second terminal, both of which are communicably connected in an ad-hoc network;

comparing the detected communication bandwidth and a bandwidth related to a storage apparatus of the first terminal;

determining an operation scheme for sharing of data in the storage apparatus of the first terminal and data in a storage apparatus of the second terminal, based on a comparison result obtained at the comparing;

notifying the second terminal of the determined operation scheme; and executing a mounting process configured to enable access of the storage apparatus of the first terminal by the second terminal, based on the determined operation scheme, wherein:

the comparing includes comparing the communication bandwidth and a bandwidth related to a main storage apparatus of the first terminal, the determining includes determining the operation scheme related to the sharing of data to be a tight coupling scheme configured to enable the first terminal to access allocated data downloaded by the second terminal using the ad-hoc communication, by converting a logical address that designates allocated data of the second terminal from the first terminal into a logical address that designates the allocated data on a main storage apparatus of the second terminal, when the communication bandwidth is equal to or greater than the bandwidth related to the main storage apparatus, and the executing includes executing a mounting process configured to enable access of the main storage apparatus of the first terminal by the second terminal, when the operation scheme is determined to be the tight coupling scheme.

17. A data sharing method to be executed by a second terminal, the data sharing method comprising:

receiving from a first terminal communicably connected to the second terminal in an ad-hoc network, an operation scheme for sharing of data in a storage apparatus of the first terminal and data in a storage apparatus of the second terminal, the operation scheme being determined at the first terminal; and executing a mounting process configured to enable access of the storage apparatus of the second terminal by the first terminal, based on the received operation scheme, wherein the executing includes executing a mounting process configured to enable access of a main storage apparatus of the second terminal by the first terminal, when a tight coupling scheme is received, the tight coupling scheme being configured to enable the first terminal to access allocated data downloaded by the second terminal using an ad-hoc communication, by converting a logical address that designates allocated data of the second terminal from the first terminal into a logical address that designates the allocated data on a main storage apparatus of the second terminal.

* * * * *